United States Patent
Yeo

(10) Patent No.: US 10,268,047 B2
(45) Date of Patent: Apr. 23, 2019

(54) LENS DRIVING DEVICE

(71) Applicant: LG INNOTEK CO., LTD., Seoul (KR)

(72) Inventor: In Jae Yeo, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/445,161

(22) Filed: Feb. 28, 2017

(65) Prior Publication Data

US 2017/0168315 A1    Jun. 15, 2017

Related U.S. Application Data

(63) Continuation of application No. 14/290,454, filed on May 29, 2014, now Pat. No. 9,618,768.

(30) Foreign Application Priority Data

| May 29, 2013 | (KR) | ......................... 10-2013-0061035 |
| Jul. 15, 2013 | (KR) | ......................... 10-2013-0082879 |
| Jul. 17, 2013 | (KR) | ......................... 10-2013-0083924 |

(51) Int. Cl.
*G02B 27/64* (2006.01)
*G02B 7/04* (2006.01)
(Continued)

(52) U.S. Cl.
CPC ............. *G02B 27/646* (2013.01); *G02B 7/04* (2013.01); *G02B 7/09* (2013.01); *G03B 3/10* (2013.01);
(Continued)

(58) Field of Classification Search
None
See application file for complete search history.

(56) References Cited

U.S. PATENT DOCUMENTS

| 6,344,148 | B1 | 2/2002 | Park et al. |
| 9,423,631 | B2 | 8/2016 | Cho et al. |

(Continued)

FOREIGN PATENT DOCUMENTS

| CN | 1881008 A | 12/2006 |
| CN | 102062926 A | 5/2011 |

(Continued)

OTHER PUBLICATIONS

Office Action dated Nov. 3, 2017 in Chinese Application No. 201410233894.9.

(Continued)

*Primary Examiner* — Derek S Chapel
(74) *Attorney, Agent, or Firm* — Saliwanchik, Lloyd & Eisenschenk

(57) ABSTRACT

A lens driving device is proposed, including a cover can whose upper side surface includes an opening formed to expose a lens and whose side surface extends from the upper side surface to a base, a base that is secured to the cover can; a housing that is arranged on top of the base and moves in first and second directions that are perpendicular to an optical axis, a bobbin that is housed in the housing and moves in an optical axis direction, an actuator that includes a magnet unit arranged in the housing, a first coil unit arranged in an outer side surface of the bobbin, and a second coil unit that is arranged on top of the base, and a substrate that is disposed between the second coil unit and the base so as to control the first coil unit and the second coil unit.

31 Claims, 14 Drawing Sheets

(51) Int. Cl.
*G02B 7/09* (2006.01)
*G03B 3/10* (2006.01)
*G03B 5/00* (2006.01)
*H02K 41/035* (2006.01)

(52) U.S. Cl.
CPC ........... *G03B 5/00* (2013.01); *H02K 41/0356* (2013.01); *G03B 2205/0015* (2013.01); *G03B 2205/0069* (2013.01)

(56) References Cited

U.S. PATENT DOCUMENTS

| | | |
|---|---|---|
| 2011/0091193 A1 | 4/2011 | Lim et al. |
| 2011/0176046 A1 | 7/2011 | Hu |
| 2011/0286732 A1 | 11/2011 | Hosokawa et al. |
| 2012/0154614 A1 | 6/2012 | Mariya et al. |
| 2012/0229926 A1 | 9/2012 | Wade et al. |
| 2013/0016427 A1 | 1/2013 | Suqawara |
| 2013/0016428 A1 | 1/2013 | Sugawara et al. |
| 2013/0039640 A1 | 2/2013 | Sekimoto |
| 2013/0050828 A1 | 2/2013 | Sato et al. |
| 2016/0011394 A1 | 1/2016 | Cho et al. |
| 2016/0018667 A1 | 1/2016 | Yeo |
| 2016/0109719 A1 | 4/2016 | Cho et al. |
| 2016/0154249 A1 | 6/2016 | Yeo |
| 2016/0191754 A1 | 6/2016 | Cho et al. |

FOREIGN PATENT DOCUMENTS

| | | |
|---|---|---|
| CN | 102879973 A | 1/2013 |
| EP | 1732312 A2 | 12/2006 |
| JP | 2011065140 A | 3/2011 |
| JP | 2011113009 A | 6/2011 |
| JP | 2013024938 A | 2/2013 |
| JP | 2013024944 A | 2/2013 |
| JP | 2013044924 A | 3/2013 |
| JP | 2013210550 A | 10/2013 |
| JP | 5348235 B2 | 11/2013 |
| WO | WO-2010044221 A1 | 4/2010 |
| WO | WO-2013/024726 A1 | 2/2013 |

OTHER PUBLICATIONS

European Search Report in European Application No. 14170517.8.
European Search report dated Jan. 5, 2015 in European Application No. 14170517.8.
Office Action dated Aug. 8, 2016 in U.S. Appl. No. 14/290,454.
Notice of Allowance dated Nov. 29, 2016 in U.S. Appl. No. 14/290,454.

LENS DRIVING DEVICE

CROSS-REFERENCE TO RELATED APPLICATIONS

This application is a continuation of U.S. application Ser. No. 14/290,454, filed May 29, 2014, which claims the benefit under 35 U.S.C. § 119 of Korean Application Nos. 10-2013-0061035, filed May 29, 2013; 10-2013-0082879, filed Jul. 15, 2013; and 10-2013-0083294, filed Jul. 17, 2013, which are hereby incorporated by reference in their entirety.

BACKGROUND

Field of the Invention

The present invention relates to a lens driving device, and more particularly to a lens driving device whose structure is improved in consideration of a user's hand-shaking correction function and an auto focusing function.

Background of the Related Art

A hand shaking phenomenon inevitably occurs when photographing with a photographing device held in hands. The hand-shaking phenomenon causes such a photographing device to shake. The images photographed along with a hand-shaking may look blurred, and it is hard to get focused accurately when focusing an object from a short distance.

In order to reduce the vibrations that occur due to the above-mentioned hand-shaking phenomenon, a recently developed photographing device is equipped with an Optical Image Stabilizer (OIS) that is configured to substantially reduce the vibrations that occur due to a hand-shaking phenomenon when a user takes a picture with a photographing device held in his hands. The OIS module is like an image stabilization module that helps correct a hand-shaking, etc. when taking a picture using a camera.

In recent years, as is adapted to a smart phone, a tablet PC (Personal Computer), etc., a camera module is disclosed for a mobile device that is generally equipped with an AF (Auto Focusing) function and a hand-shaking prevention function.

The OIS module is adapting a lens shift method wherein a lens is configured to move horizontally in response to an object that is moving along the X- and Y-axes.

However, in case of the above mentioned lens shift method, it is directed to further moving on the X- and Y-axes the lens unit that moves on the Z-axis by means of the AF module, which operation requires a certain space in the AF module to move the lens unit on the X- and Y-axes. For this reason, the width of the camera module increases due to its structural characteristic, so it is hard to manufacture a compact-sized and thinner photographing device.

Since the lens in the AF module is configured to substantially move in a horizontal direction, the optical axis of the optical system may be shaken.

BRIEF SUMMARY

Accordingly, it is an object of the present invention to provide a camera module whose AF function and OIS function are more fast responsive and become more reliably operative as compared with the conventional art.

It is another object of the present invention to provide a camera module at can be easily assembled.

To achieve the above objects, there is provided a lens driving device, comprising a cover can whose upper side surface includes an opening formed to expose a lens and whose side surface extends from the upper side surface to a base; a base that is secured to the cover can; a housing that is arranged on top of the base and moves in first and second directions that are perpendicular to an optical axis; a bobbin that is housed in the housing and moves in an optical axis direction; an actuator that includes a magnet unit arranged in the housing, a first coil unit arranged in an outer side surface of the bobbin, and a second coil unit that is arranged on top of the base; and a substrate that is disposed between the second coil unit and the base so as to control the first coil unit and the second coil unit.

In addition, the housing comprises at least two lower stoppers that protrude from a lower side surface, and the base comprises a base body that is shaped to match with an inner side surface of the cover can, a hollow portion that is formed at the center of the base body, and an engaging portion that protrudes from top of the base body and is in a surface-contact with the inner side surface of the cover can, and the engaging portion of the base comprises a recess portion that accommodates the lower stopper and limits the downward movement and the first and second direction movement of the housing.

In addition, the bobbin comprises at least two flange units that are vertically disposed on an outer surface of the bobbin, and the housing comprises mounting portions in an inner side surface, the flange units being mounted in the mounting portions.

In addition, the housing comprises at least two upper stoppers that protrude from an upper side surface of the housing and that are positioned close to the cover can.

In addition, the upper stoppers are arranged dose to the magnet unit.

In addition, the first coil unit is arranged to face an inner side surface of the magnet unit, and the second coil unit is arranged to face a lower side surface of the magnet unit.

In addition, the second coil unit is either a patterned coil or a separate coil.

In addition, the second coil unit and the substrate are coupled by a soldering method, and the body of the base comprises a solder ball accommodation groove in which to accommodate the solder balls that are produced during the engagement of the second coil unit and the substrate.

In addition, there is further included an elastic unit that transfers electric power inputted through the substrate to the first coil unit and that supports the first or second direction movement of the housing.

There is further provided an upper spring that is arranged on top of the housing; a lower spring that is arranged at a lower portion of the housing; and at least two or at least four side springs that are arranged between the housing and the base.

In addition, two of the side springs are electrically connected to the substrate and the upper spring, and the upper spring comprises a first upper spring that is electrically connected to an end of a coil wound on the first coil unit, and a second upper spring that is electrically connected to the other end of the coil wound on the first coil unit.

There is further provided a hall sensor unit that is mounted on the substrate to detect the movements of the actuator.

In addition, the base comprises a hall sensor accommodation groove that is formed to accommodate the hall sensor unit.

In addition, the magnet unit comprises four magnets that are arranged at regular intervals at an angle of 90°, and the hall sensor unit comprises two hall sensors that are arranged on a straight line along with the magnet unit about an optical axis and are arranged to face the neighboring magnets.

In addition, the magnet unit is arranged in a corner of the housing and comprises a first magnet that faces the first coil unit and a second magnet that faces the second coil unit.

In addition, the upper spring, the lower spring or the side spring is a leaf spring.

In addition, the side spring comprises a first engaging portion that is engaged to a side surface of the housing; a second engaging portion that is engaged to a side surface of the base; and a elastic portion that connects the first engaging portion and the second engaging portion and includes at least one bending portion.

In addition, the elastic portion comprises two bending portions that face each other between the first engaging portion and the second engaging portion.

In addition, in an outer surface of the housing is formed a side surface engaging protrusion for securing the first engaging portion, and in the first engaging portion is formed a side surface engaging hole or a groove that is engaged to the side surface protrusion, and in each side of the base is formed a side spring insertion groove in which the second engaging portion is inserted or arranged.

$$K_x = 0.5 \sim 2.0 K_y$$

$$K_z = 5 \sim 100 K_x \qquad \text{<Conditional Expression>}$$

where, K represents a spring constant, $K_z$ represents a spring constant of a component in an optical axis direction, and $K_x$ and $K_y$ represent spring constants of components in a first direction and a second direction.

ADVANTAGEOUS EFFECTS

In a preferred embodiment of the present invention, there is provided a camera module whose operation is fast responsive and is reliable in its operation, which can be obtained in such a way that an auto focusing function is obtained by a lens unit, and a hand-shaking prevention function is obtained by a housing structure.

The camera module according to a preferred embodiment of the present invention comprises a side spring that has a good impact resistance and a reliable hand-shaking prevention function.

In a preferred embodiment of the present invention, a product can be easily assembled with the aid of an attractive force because a second coil unit and a magnet unit are arranged on a straight line.

BRIEF DESCRIPTION OF THE DRAWINGS

Further objects and advantages of the invention can be more fully understood from the following detailed description taken in conjunction with the accompanying drawings in which.

DETAILED DESCRIPTION

The terminology used herein, unless otherwise defined, represents the same meaning as that of the terminology an ordinary person skilled in an art uses, and if the terminology used herein is in conflict with the general terminology, its interpretation is subject to the definition of the present invention.

The invention described herein is for the purpose of describing particular embodiments only and is not intended to be limiting of the invention. It is noted that the same reference numbers through the specification mean the same components.

Figure 1:
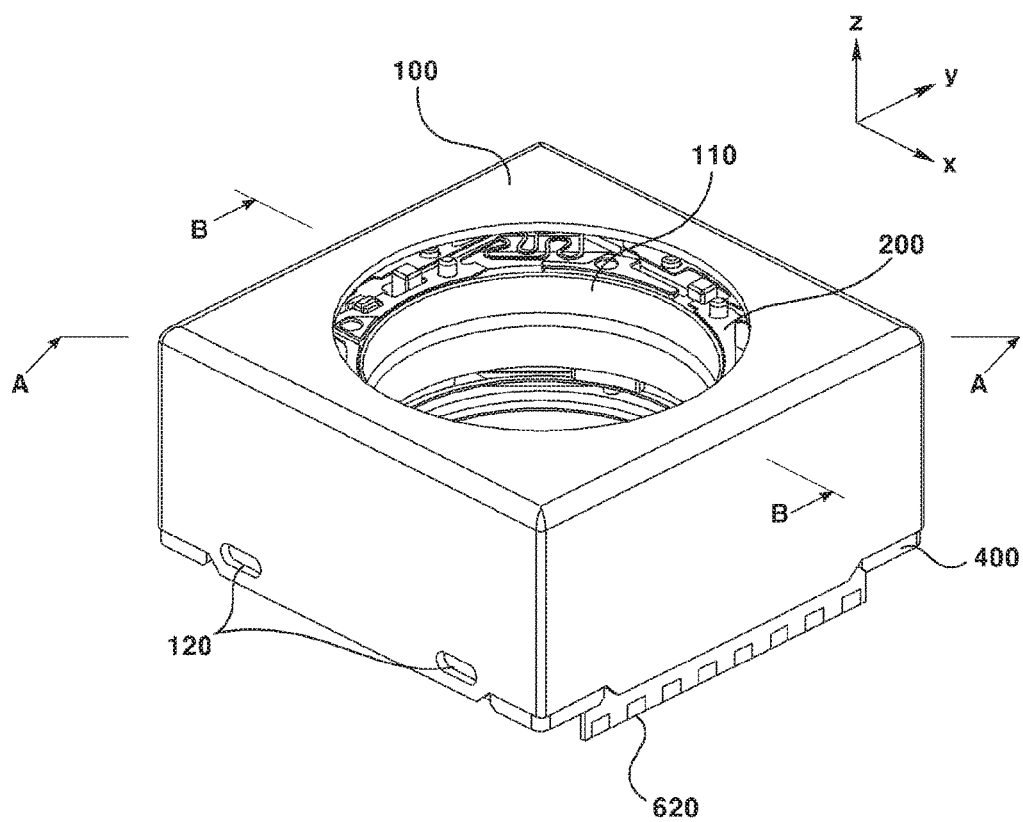
FIG. 1 is a perspective view illustrating a camera module according to a preferred embodiment of the present invention.

FIG. 1 is a perspective view illustrating a lens driving motor according to a preferred embodiment of the present invention.

As shown in FIG. 1, the Z-axis represents an optical axis direction, and the X-axis represents a first direction that is perpendicular to the X-axis direction, and the Y-axis represents a second direction that is perpendicular to each of the Z-axis and the X-axis.

An preferred embodiment and another embodiment that are described hereinafter are directed to a camera module whose Automatic Focusing (AF) function and hand-shaking prevention function are fast responsive and more reliable in their operations and whose durability and assembling property are enhanced. The technical features of the present invention will be described below with reference to the accompanying drawings.

Figure 2:
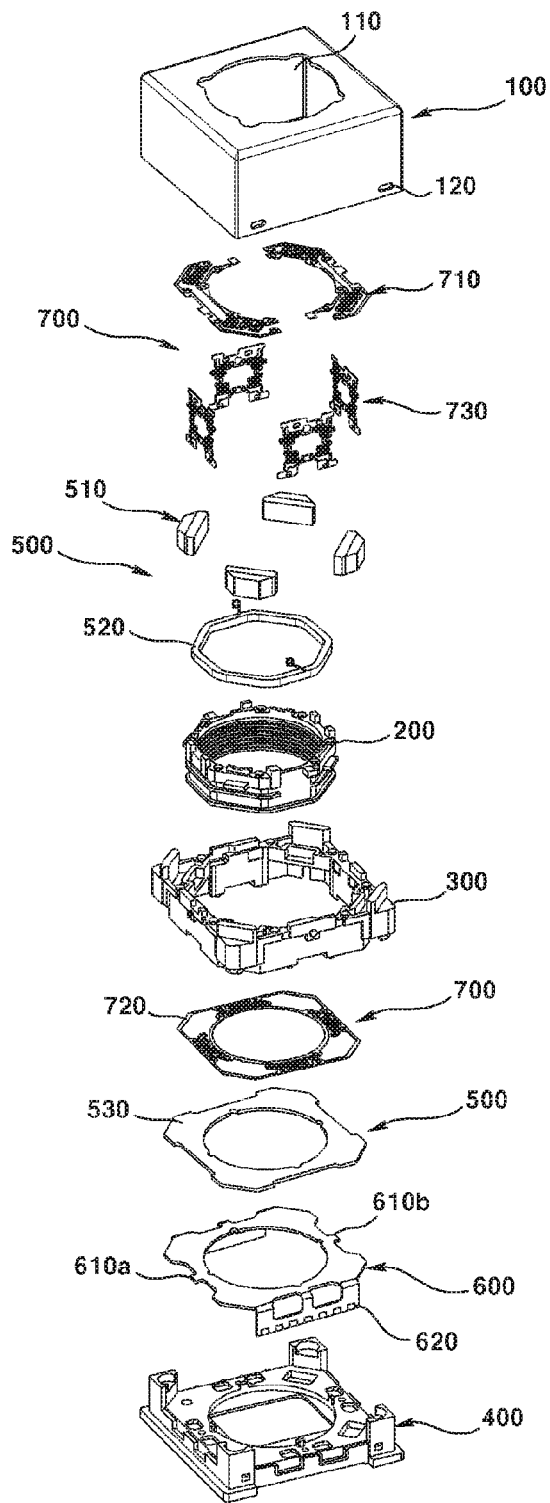
FIG. 2 is a disassembled perspective view illustrating a camera module according to a preferred embodiment of the present invention.
Figure 3:
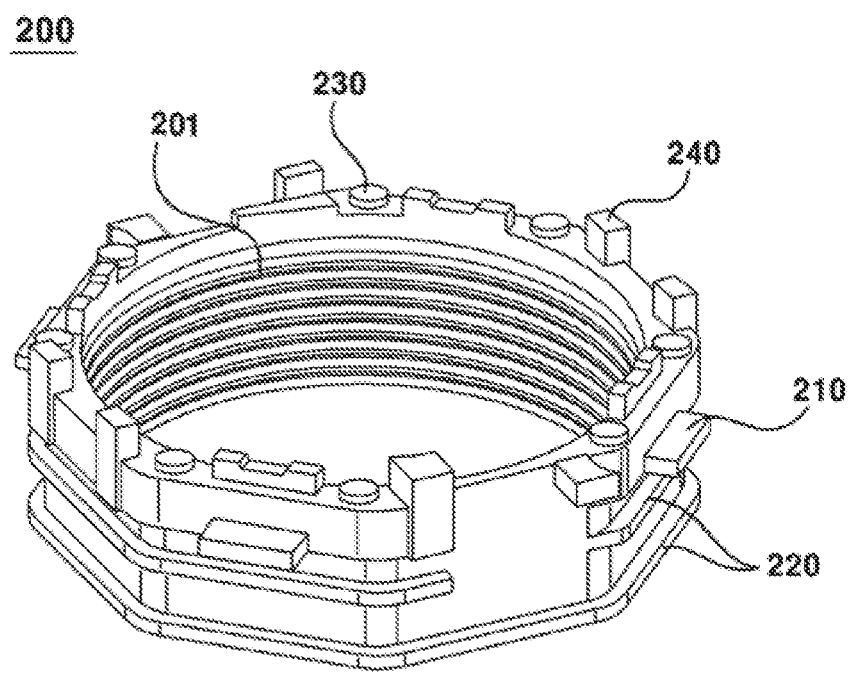
FIG. 3 is a perspective view illustrating a bobbin according to a preferred embodiment of the present invention.
Figure 4:
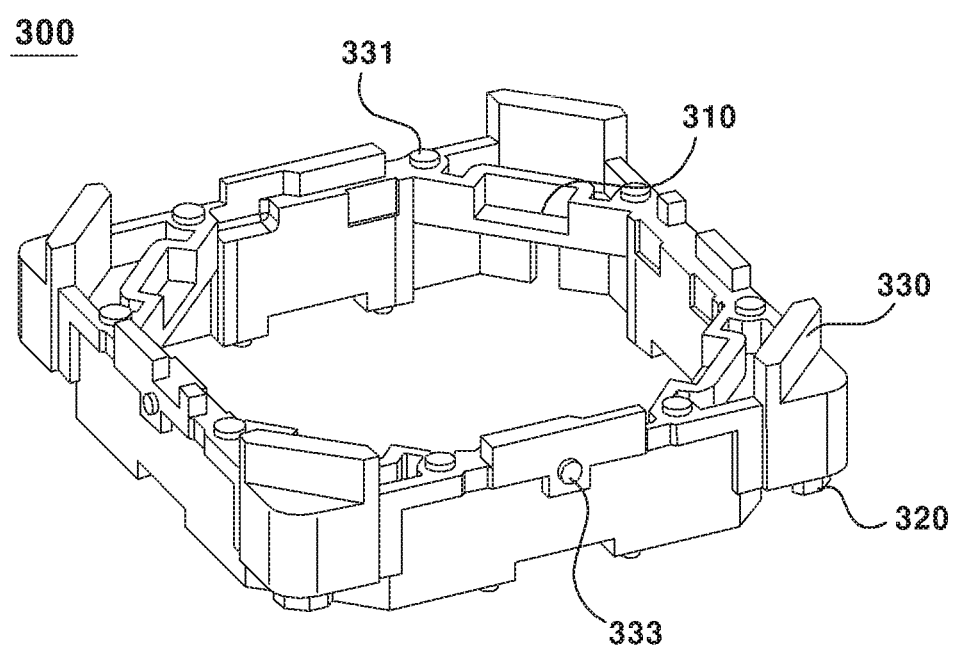
FIG. 4 is a perspective view illustrating a housing according to a preferred embodiment of the present invention.
Figure 5:
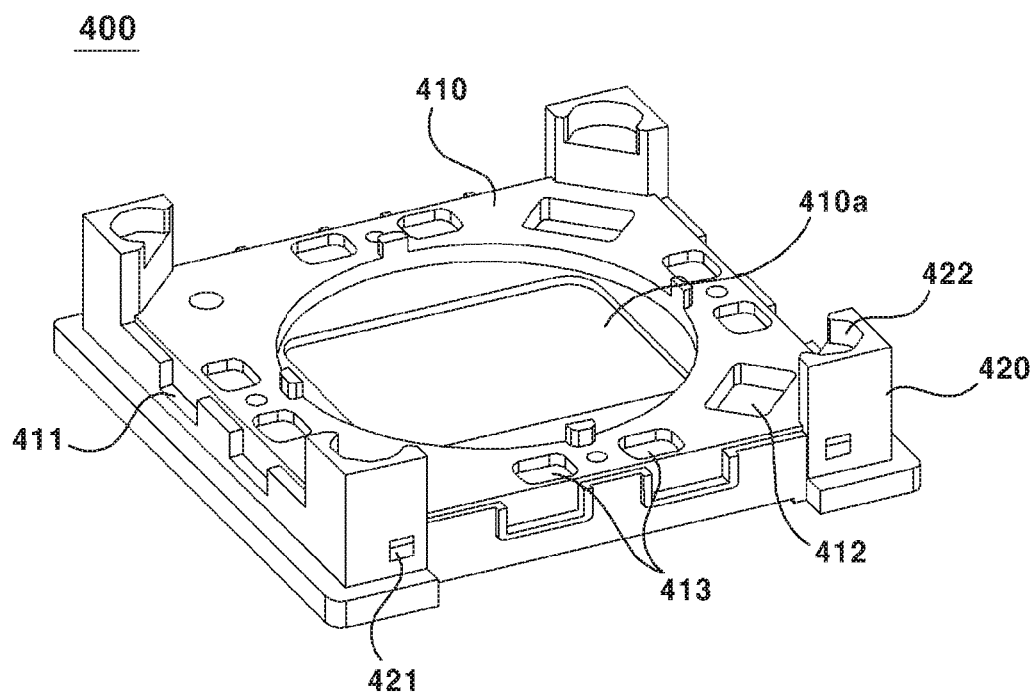
FIG. 5 is a perspective view illustrating a base according to a preferred embodiment of the present invention.
Figure 6:
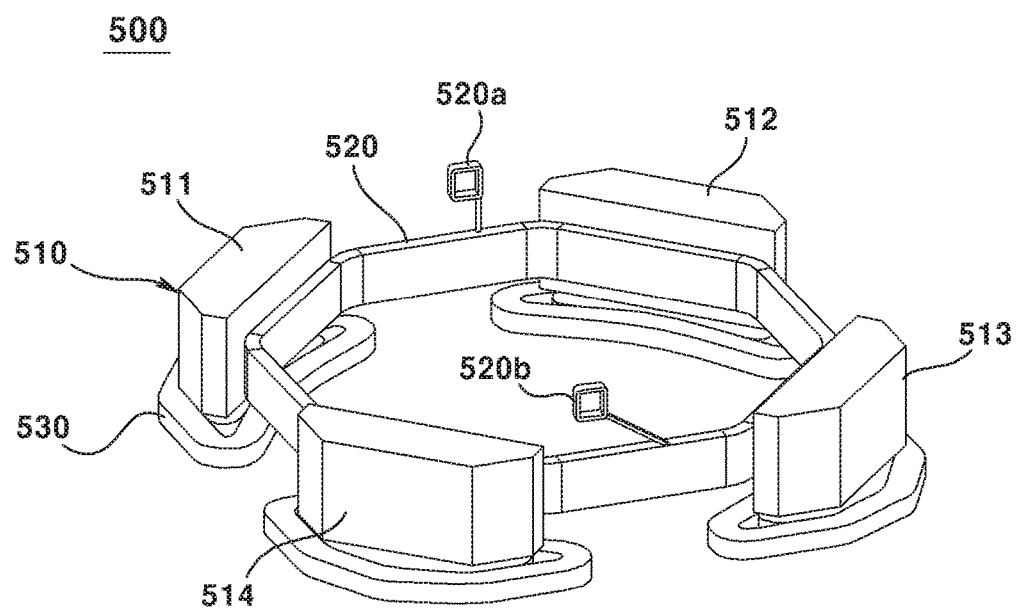
FIG. 6 is a schematic view illustrating an actuator according to a preferred embodiment of the present invention.
Figure 7:
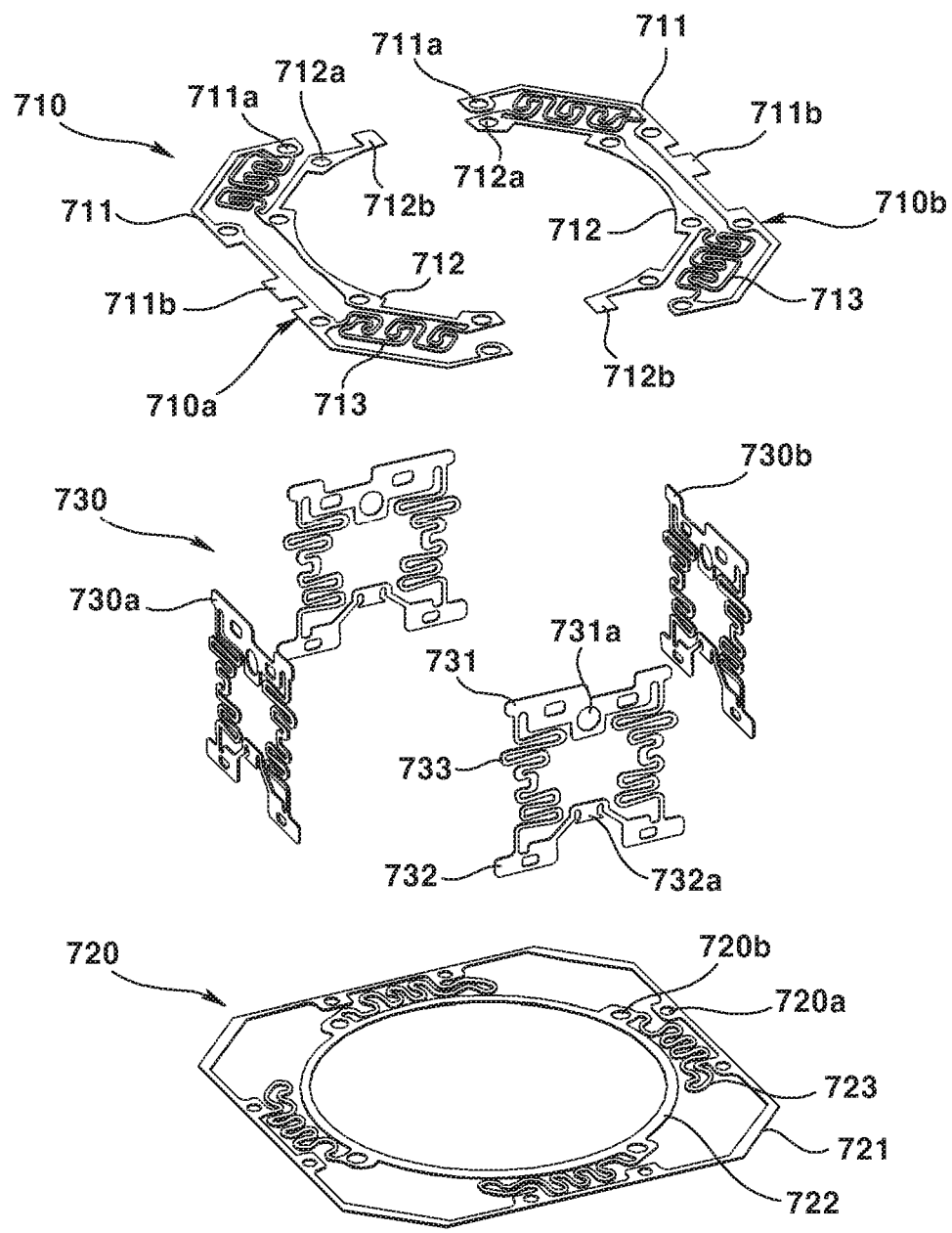
FIG. 7 is a view illustrating an elastic unit according to a preferred embodiment of the present invention.
Figure 8:
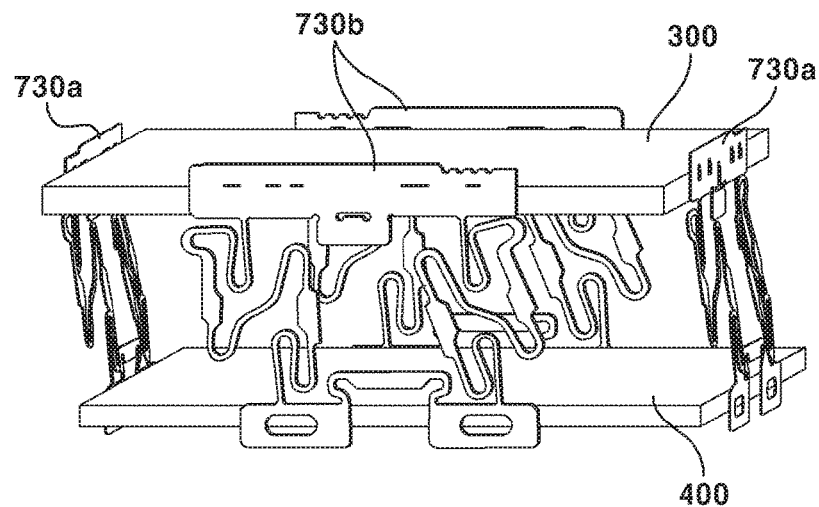
FIG. 8 is a little transformed perspective view illustrating a side spring, which view is shown for better understanding of a preferred embodiment of the present invention.
Figure 9:
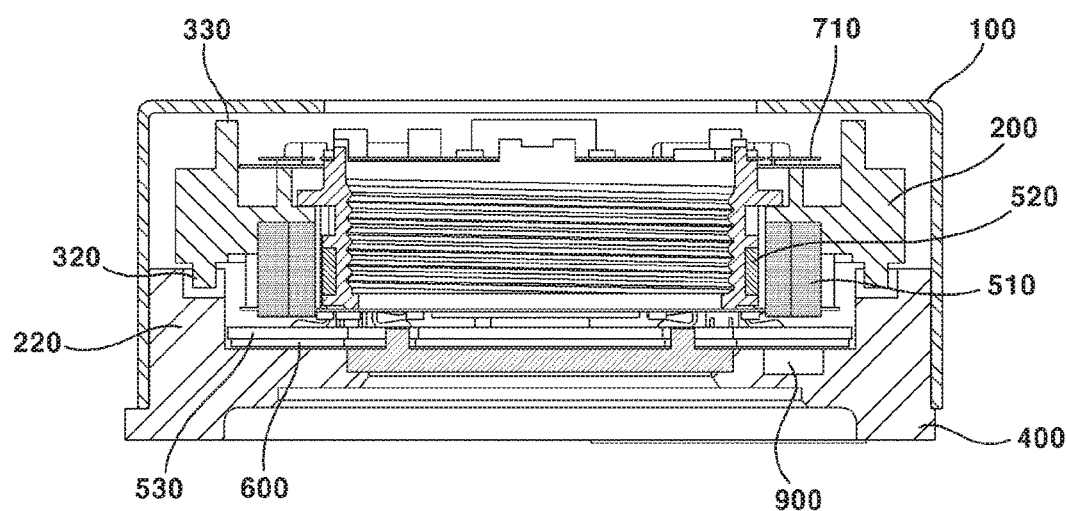
FIG. 9 is a side cross sectional view taken in a diagonal direction of a camera module according to a preferred embodiment of the present invention.

FIG. 2 is a disassembled perspective view illustrating a camera module according to a preferred embodiment of the present invention. FIG. 3 is a perspective view illustrating a bobbin according to a preferred embodiment of the present invention. FIG. 4 is a perspective view illustrating a housing according to a preferred embodiment of the present invention. FIG. 5 is a perspective view illustrating a base according to a preferred embodiment of the present invention. FIG. 6 is a schematic view illustrating an actuator according to a preferred embodiment of the present invention. FIG. 7 is a view illustrating an elastic unit according to a preferred embodiment of the present invention. FIG. 8 is a little transformed perspective view illustrating a side spring, which view is shown for better understanding of a preferred embodiment of the present invention. FIG. 9 is a side cross sectional view taken in a diagonal direction of a camera module according to a preferred embodiment of the present invention.

As shown in FIG. 1, the lens driving motor according to an embodiment of the present invention comprises, as its main components, a cover can 100, a bobbin 200, a housing 300, a base 400, and an actuator 500. It may further comprise a substrate 600 and/or an elastic unit 700.

As shown in FIGS. 1 and 2, the cover can 100 is configured to house the bobbin 200, the housing 300, the base 400 and the elastic unit 700 and is mounted on the base 400, which construction contours an exterior of a camera module or a lens driving motor.

As shown therein, on top of the cover can 100 is formed an opening 110 through which a lens is exposed. The cover can 100 may be formed in a rectangular parallelepiped shape whose bottom is open, but it may be formed in various shapes. More specifically, the cover can 100 may be formed in a quadrangle shape or an octagonal shape when viewing from above, and it is not limited thereto.

Since the inner surface of the cover can 100 comes into close contact with a side surface portion or an upper surface of the base 400, the lower side surface of the cover can 100 can be closed by the base 400 for thereby protecting internal components from external impacts and preventing impurities from entering. For the sake of an engagement between the base 400 and the cover can 100, there may be provided at least one engaging hole 120 in a side surface of the cover can 100, more specifically, in one side surface or in a side lower portion. In a side surface of the base 400 is provided an engaging protrusion 421 that is inserted in the engaging hole 120, so the camera module or the lens driving motor can have a reliable sealingfunction and engaging function.

The cover can 100 may have a function of protecting the components of the camera module or the lens driving motor from external radio interferences from a cellular phone or the like. The cover can 100 may be preferably made from metallic material or may be made from other materials such as a molded material or an insert molded material using a metallic material.

As shown in FIGS. 2 and 3, the bobbin 200 is housed in a housing 300 that will be described later. The bobbin 200 may include a lens barrel (not shown) with which to take a picture of an object. The bobbin is housed in the housing 300 and is secured to the lens barrel (not shown) that will be assembled to the camera module. The bobbin 200 can move in the Z-axis direction by means of the actuator 500 with respect to the housing 300.

The lens barrel (not shown) may be formed in a form of a cylindrical case that is configured to fix at least one lens. On an outer circumferential surface of the lens barrel may be formed threads that match with the threads 201 formed in the inner surface of the bobbin 200 for a thread engagement. The lens barrel may be engaged without using threads, and more specifically, it may be engaged using an adhesive or the like. The lens barrel may belong to the necessary components of the camera module.

In an outer circumferential surface of the bobbin 200 may be provided at least two protruding flange units 210. The flange units 210 are mounted on a mounting unit 310 of the housing 300 or are arranged therein, the constructions of which may serve to limit the downward movement and/or rotational movements of the bobbin 200. In an outer surface of the bobbin 200 is provided a fixing rib 220 that protrudes for a first coil unit 520 to be arranged. The fixing rib 220 may be formed in a lower side surface of the flange unit 210 in the outer surface of the bobbin 200. The first coil unit may be directly wound on an outer surface of the bobbin or a previously wound coil may be arranged outside the bobbin or may be fixed.

At least two engaging protrusions matching with an inner engaging hole 712a or an engaging groove that is formed in an inner portion 712 of an upper spring 710 protrude from an upper surface of the bobbin 200. At least two auxiliary stoppers 240 positioned close to the cover can 100 may protrude. The upper surface engaging protrusion 230 and the inner engaging hole 712a are fixed by a thermosetting, adhering or soldering way after they are inserted. In addition, the auxiliary stoppers may be provided by four or six in number or eight in number or by even number or by odd number.

As shown in FIGS. 2 and 4, the housing 300 is mounted on the base 400 and supports the bobbin 200.

The housing 300 is supported by a side spring that will be described later. The housing 300 may be installed above the base 400 (refer to FIG. 9).

More specifically, the housing 300 is configured in a predetermined shape that matches with the shape of the base 400. In a preferred embodiment of the present invention, the base 400 and the housing 200 are formed in quadrangle shapes. The shapes of the same are not limited thereto.

In the outer surface of the housing 300, a side surface engaging protrusion 333 protrudes from each side surface to engage a first engaging portion 731 of the side spring 730. In the first engaging portion 731 of the side spring 730 is formed a first engaging hole 731a or an engaging groove that matches with the side surface engaging protrusion 333. The side surface engaging protrusion 333 and the upper surface first engaging hole 731a or the engaging groove are fixed by a thermosetting, adhering or soldering way after they are inserted.

In the upper surface of the housing 300, an upper engaging protrusion 331 protrudes from each upper surface to engage an outer portion of the upper spring 710. In an outer portion 711 of the upper spring 710 may be formed an upper surface engaging groove 711a or an engaging groove that matches with the upper engaging protrusion 331. The upper engaging protrusion 331 and the upper surface engaging hole 711a or the engaging groove may be fixed by a thermosetting, adhering or soldering way after they are inserted.

In the housing 300, at least two upper stoppers 330 may protrude from the upper surface and are positioned close to the inner surface of top of the cover can 100. There may be included at least two lower stoppers 320 that protrude from the lower surface and that float in a recess portion 422 of the base 400 when electric power is applied or that is arranged in the recess portion of the base.

The upper stopper 330 and the lower stopper 320 are arranged on a straight line about the Z-axis for thereby enhancing durability with respect to impacts and are positioned close to a magnet unit 510 that will be described later for thereby preventing any transformation of the housing 300 from bending stress which is caused by the weight of the magnet unit 510, the construction of which is not limited thereto.

A mounting portion 310 is formed in an inner side of the housing 300. The flange unit 210 of the bobbin 200 is mounted on or arranged in the mounting unit 310, so the downward movement or rotation of the bobbin 200 can be limited. The mounting portion 310 may continuously protrude from an inner surface of the housing 300 to form a rim shape or a groove shape or it can be formed at a regular interval as shown in the drawing.

As shown in FIGS. 2 and 5, the base 400 is formed in a predetermined shape that matches with an opening at the lower portion of the cover can 100. In the preferred embodiment of the present invention, the base 400 is formed in a quadrangle shape, which is not limited thereto. The base 400 is secured to the bottom of the cover can 100 and is configured to support the components housed in the cover can 100 from below.

The base 400 comprises a base body 410 that is formed in a predetermined shape matching with the inner surface of the cover can 100, a hollow portion 410a formed at the center of the base body 410, and an engaging portion 420 that protrudes from the top of the base body 410 and that comes into contact with the inner surface of the cover can 100. Here, the engaging portion may not be provided, For a reliable engagement with the cover can 100, in the side surface of the base body 410 or the engaging portion 420 may be formed an engaging protrusion 421 that matches with the engaging groove 120 formed in the cover can 100. On the contrary, an engaging protrusion (not shown) may formed inside the side surface of the cover can 100, and an engaging hole (not shown) or an engaging groove may be formed in the base 400.

In each side of the base body 410 may be formed a side spring insertion groove 411 in which the second engagement portion 732 of the side spring 730 is inserted or arranged. The second engaging portion may be inserted or arranged in a slit-shaped groove.

In the upper surface of the base body 410 may be formed a solder ball accommodation groove 413 that is configured to accommodate solder balls (not shown) producing in the course of soldering engagement orland a hall sensor accommodation groove 412 that is configured to accommodate a hall sensor unit that will be described later, so the entire volume of the camera module or the lens driving motor can be compact-sized.

The solder ball accommodation grooves 413 are formed at regular intervals on the upper surface of the base body 410. The hall sensor accommodation groove 412 may be formed on a straight line about the magnet unit and the X-axis direction (refer to FIG. 9). Since the hall sensor accommodation groove 412 is configured to detect the magnet movement displacement in the first direction (X-axis direction) and/or the second direction (Y-axis direction), so that they can be provided by two or more. They may be arranged, closely to each other, in a side close to the base.

In top of the engaging part 420 or in the base body may be provided a recess portion 422 that accommodates the lower stopper 320 of the housing 300 and that limits the downward movement and the X- and Y-axes rotations of the housing 300. The recess portion may be arranged in a corner of the base or in a side.

Here, in the engaging portion 420, the recess portion 422 may be formed in a semicircular shape or variously groove shapes. The bottom of the same can limit the downward movement along with the lower stopper 420, and the side surface can limit the rotational motions (X- and Y-axes) of the housing.

As shown in FIGS. 2 and 6, the actuator 500 according to the present invention is equipped with two coil units 520 and 530 in the magnet unit 510, with which to obtain a hand-shaking prevention function and an auto focusing function. More specifically, the coil unit 520 provides an auto focusing function, and the coil unit 530 provides a hand-shaking prevention function.

The housing 300 according to an embodiment of the present invention is positioned above the base 400 and can move in the X- and Y-axes, and the bobbin 200 is housed in the housing 300 and can move in the Z-axis that is an optical axis direction.

For the movements of the housing 300 and/or the bobbin 200, the actuator 500 comprises a magnet unit 510 that is arranged in the housing 300 or is arranged in an inner side surface of the housing, a first coil unit 520 that is arranged in the bobbin 200 to move the bobbin 200 in the Z-axis direction or is arranged in an outer side surface of the bobbin, and a second coil unit 530 that is arranged in an upper surface of the base 400 so as to move the housing 300, in which the bobbin 200 is housed, in the X- and Y-axes directions.

Here, the first coil unit 520 is arranged facing the inner surface of the magnet unit 510, and the second coil unit 530 is arranged facing the lower surface of the magnet unit 510.

More specifically, the first coil unit 520 may be previously wound in a predetermined shape that matches with the outer circumferential surface of the bobbin 200. In this case, the fixing rib 220 may be removed. In addition, the first coil unit may be wound on the fixing rib 220 formed in the outer side surface of the bobbin 200, so it can be arranged in an outer circumferential surface of the bobbin 200 and may be electrically connected to a substrate 600 which will be described later, so it can be electrically controlled.

The coils wound on the first coil unit 520 generate electromagnetic field using current, and the generated electromagnetic field interacts with the electromagnetic field of the magnet unit 510, thus moving the bobbin 200 in the Z-axis direction (up and down directions) that is the optical axis direction. Here, the up and down movements of the bobbin 200 can be supported or limited by the upper spring 710 and the lower spring 720.

Electric power applied to the first coil unit 520 is supplied to the substrate 600, a pair of or two side springs 730 electrically connected to the substrate 600, and a pair or two upper springs 710 electrically connected to the pair or two side springs 730. Electrically connected relationship will be described later in details. The pair or two side springs may be arranged facing each other or may be arranged close to each other. The electric power may be current or voltage.

The second coil unit 530 is arranged on the upper surface of the base 400 so as to move the housing 300 in the X- and Y-axes directions.

In more details, the second coil unit 530 may be mounted on the substrate 600 or may be arranged thereon and may be electrically connected to the substrate 600. Different from the circular first coil unit 520, it may be provided by four in number on the substrate 600 at an angle of 90° between them. The four second coil units 530 each may be separately disposed on the substrate 600 or may be disposed in two pairs or may be grouped into some depending on the design specification and then may be controlled.

The second coil unit 530 is positioned on a straight line in the Z-axis direction with the magnet unit 510 so as to move the housing 300 in the X- and Y-axes directions.

The current applied via the substrate 600 is applied to the coils wound on the second coil unit 530 for thereby generating electromagnetic field, and the generated electromagnetic field interacts with the electromagnetic field of the magnet unit 510 for thereby moving the housing 300 in the X- and Y-axes directions.

The magnet unit is arranged in a corner of the housing and comprises a first magnet that faces the first coil unit, and a second magnet that faces the second coil unit. Here, the first magnet and the second magnet may be integrated. In case that the magnet unit is arranged in a corner of the housing, it may be formed in an angular pillar shape or a triangle shape, a trapezoid pillar shape, a polygonal pillar shape or a pillar shape with a chamfer at part of the angular pillar shape. Each corner of the magnet unit may have a value "R" in terms of process or may be curved on the basis of design.

The magnet unit may be arranged in a side of the housing. in this case, it may have a quadrangle pillar shape, and each corner may have a value "R" in terms of process or may be curved on the basis of design.

When a compactness of a camera module is considered, more specifically, when it needs to lower the height in the Z-axis direction that is the optical axis, the second coil unit 530 may include a patterned coil or a separate coil.

In this case, the bottom surface of the second coil unit 530 is soldered on a side surface or an upper surface of the substrate 600 or is electrically connected using Ag epoxy or a conductive epoxy and is mounted on the substrate 600. Since the solder balls (not shown) or the AG epoxy or the conductive epoxy that are formed in the course of soldering builds a height in the Z-axis direction of the camera module, in the base 400 of the present invention may be formed a soldering accommodation groove 413 that accommodates the solder balls or the AG epoxy or the conductive epoxy.

As shown in FIGS. 1 and 2, the substrate 600 is engaged to or arranged in or secured to the base 400 and is mounted on the base 400 so as to control the actuator 500.

In order to apply electric power to control the first coil unit 520 and the second coil unit 530, the substrate 600 may be disposed between the second coil unit 530 and the base 400 and may be like the Flexible Printed Circuit Board (FPCB).

The substrate 600 may include two soldering points 610a and 610b formed to be electrically connected to second engaging portions 732 of two side springs 730a and 730b. The two second engaging portions 732 each may include a soldering portion 732a where is soldered to the soldering point 610a, 610b of the substrate 600.

The above mentioned substrate 600 may include a terminal portion 620 curved in a downward direction from at least one side so as to receive electric power since it is electrically connected to a separate Printed Circuit Board. The above mentioned Printed Circuit Board may be like a Printed Circuit Board that belongs to the camera module that will be described later. The substrate is bent at two side surfaces and may be arranged in or secured to the base. The terminal may be provided by multiple numbers or may be provided by at least two in number or may be provided by four or eight in number or by more than fourteen in number.

As shown in FIGS. 2 and 7, the elastic unit 700 comprises an upper spring 710, a lower spring 720, and a side spring 730.

The upper spring 710, the lower spring 720 and the side spring 730 may be arranged in each surface of the housing 300 or may be made from a common coil spring or for enhanced efficiency in productivity it may be made from a leaf spring wherein a single plate sheet is bent and cut.

The upper spring 710 is engaged to be secured to top of the housing 300 and top of the bobbin 200, thus supporting the bobbin 200. It may be provided on top of the housing 300 so as to provide a returning force when the bobbin 200 moves upward or downward.

More specifically, the upper spring 710 comprises an electric power input member 710a (first upper spring) to which electric power from the Printed Circuit Board 600 is inputted, and an electric power output member 710b (second upper spring) from which the applied electric power is outputted and conducted to the first coil unit 520.

The first upper spring 710a and the second upper spring 710b may be made from leaf springs and are symmetrical about the optical axis and may be made from a single leaf spring. They may be made from two springs that are partly cut and electrically insulated. It is preferred that they are made from a separate leaf spring for the sake of input and output of electric power.

The first upper spring 710a and the second upper spring 710b each comprise a first support portion 711 (outer portion), a second support portion 712 (inner portion) secured to the bobbin 200, and an upper elastic portion 713 (connection portion) that electrically connects the outer portion 711 and the inner portion 712.

As shown in the drawing, the connection portion 713 may be two bending portions that are disposed between the outer portion 711 and the inner portion 712, which construction is not limited thereto. It may be provided by one or more than one. The bent portion of each spring may be arranged by multiple numbers or multiply bent portion may be symmetrically arranged.

As described earlier, at least one upper engaging protrusion 331 is provided on an upper surface of the housing 300. In the outer portion 711 may be formed an outer side engaging groove 711a or a groove that is formed matching with the upper side engaging protrusion 331. The outer side engaging groove 711a or a groove may not be formed.

In the outer portion 711 may be formed a first protrusion 711b that is electrically connected to two side springs 730, respectively, or such a protrusion may not be formed. The first protrusion 711b is electrically connected to the side spring 730. Here, the first protrusion 711b may be bent integrally with the side spring 730 or may be electrically connected by a soldering or lead soldering or Ag epoxy or conductive epoxy.

In the upper surface of the bobbin 200 is formed at least one upper surface engaging protrusion 230, and in the inner portion 712 is may be formed an inner side engaging hole 712a or a groove that matches with the upper surface engaging protrusion 230.

In each of the inner portions 712 of the first side spring 710a and the second upper spring 710b may be formed a second protrusion 712b that is electrically connected to an end 520a and the other end 520b of the coil wound on the first coil unit 520 or such as a component may be not formed.

Here, the first protrusion 711b and the side spring 730, the second protrusion 712b and an end 520a and the other end 520b of the coil of the second protrusion portion 712b may be electrically connected by a soldering or lead soldering or Ag epoxy or conductive epoxy.

The lower spring 720 is arranged in a lower end of the housing 300 so as to support the bottom of the bobbin 200. The electric power of the substrate 600 is not inputted or outputted, it may be made from a single leaf spring. Here, the lower spring 720 comprises an outer portion 721 arranged in the housing 300, an inner portion 722 arranged in the bobbin 200, and a connection portion 723 that connects the outer portion 721 and the inner portion 722. The outer portion 721 and the inner portion 722 of the lower spring 720 may comprise at least two lower engaging holes 720a and 720b or grooves that are engaged to the protrusion (not shown) formed in the lower surface of the housing 300 or the bobbin 200.

For vibration attenuation of the X- and Y-axes, the side spring 730 is engaged to or secured to a surface of the housing or to a portion of a side surface or part of the side surface of the housing 300. The other end or part of the same is engaged to a side surface of the base 400. The side spring 730 may include four side springs that are arranged at regular intervals with an angle of 90°.

More specifically, the side spring 730 comprises a first engaging portion 731 engaged to a side surface of the housing 300, a second engaging portion 732 engaged to a side surface of the base 400, and an elastic portion 733 that connects the first engaging portion 731 or the second engaging portion 732 or that is vertically formed with respect to the first engaging portion 731 and the second engaging portion 732.

Here, the elastic portion 733 may be at least one bending portion. The elastic portion 733 may be provided by two that face each other with respect to one side spring 730 or it may be provided by one in the center or at a predetermined position.

In the first engaging portion 731 of the side spring 730 is formed a first engaging hole 731a or a grove that matches with the side surface engaging protrusion 333 formed in the housing 300. Here, the engaging protrusion 333 and the first engaging hole 731a or the groove may be fixed by a thermosetting, adhering or soldering or welding way.

In the same way, the second engaging portion 732 is engaged to or secured to the base 400 in the same way as in the first engaging portion 731. A side spring insertion groove 411 same as or matching with the width of the second engaging portion 732 may be formed in the base 400 or a slit-shaped groove may be formed, so the second engaging portion 732 may be slide-engaged in or inserted in the slit-shaped groove or may be arranged in such an insertion groove or may be engaged to or secured to the same.

A damper member may be coated on an adhering surface of the side spring 730 and the housing 300 and/or the base 400. The damper member may be made from sol or gel material or V silicon material or epoxy material. It may be coated between the side spring 300 and the housing 300 and/or the base 400 for thereby absorbing impacts or vibrations.

The side spring 730 is provided by at least two that are arranged in a side surface of the housing 300 and the base 400 or are engaged thereto wherein two side spring 730 face each other. For efficient vibration attenuation, the damper member may be provided in each of the four sides of the housing 300.

The second engaging portion 732 of each of the two side springs 730a, 730b among the side spring 730 is electrically connected to the substrate 600, and the first engaging portion 731 of each of the two side springs 730a and 730b is electrically connected to the upper spring 710, and the upper spring 710 is electrically connected to the end 520a and the other end 520 of the coil wound on the first coil unit 520.

In the preferred embodiment of the present invention, a separate electric power cable to apply electric power to the first coil unit 520 is not necessary, so the reliability and durability of the camera module can be improved, and the compactness of the product can be obtained.

Referring to FIG. 8, the side spring 730 according to a preferred embodiment of the present invention will be described.

As shown in FIG. 8, the side spring 730 receives force in its leftward direction. The side spring 730a of each of both sides receives force in the fx direction, and the side spring 730b of each of the front and rear sides receives force in the fy direction.

It just needs that an end and the other end of each elastic portion 733 of each of all the side springs 730 are positioned on a vertical line with respect to the first engaging portion 731 and the second engaging portion 732, and a bending portion, that corresponds to at least one elastic portion 733, may be formed at an intermediate portion and satisfies the conditional expression below.

$$K_x = 0.5 \sim 2.0 K_y,$$

$$K_z = 5 \sim 100 K_x, \qquad \text{<Conditional Expression>}$$

where, K represents a spring constant.

It is preferred that the spring constant of the X-axis direction and the spring constant of the Y-axis direction are around same, and it is preferred that the spring constant of the Z-axis direction is about 5 times to 100 times higher than the spring constant of the X-axis direction or the Y-axis direction.

The reason it is preferred that the above mentioned conditional expression is satisfied comes from the formula "$f = K_x$", where "f" represents a force of a magnet coil, and "x" represents a moving distance. If the value "K" is small, the bobbin can be moved on the basis of the value "f". The spring constant corresponding to the value K should be considered in view of the X-, Y- and Z-axes directions.

The reason that the X-axis movement is considered for the side spring 730 so as to provide a returning force with respect to the movements in the X- and Y-axis directions comes from the consideration on the weight itself of the bobbin 200 in which contains the lens. In addition, it comes from the fact that the photographing direction of the camera can direct toward the ground or the sky.

Here, the structure and engaging relationship of the camera module according to a preferred embodiment of the present invention will be described.

As shown in FIG. 9, the housing 300 and/or the base 400 matches with the shape of the inner side surface of the cover can 100. If the inner side surface of the cover can 100 is a quadrangle shape, the housing 300 and/or the base 400 may be formed in the quadrangle shape.

In this state, in consideration of the circular bobbin 200 positioned in the housing 300, it is preferred that the magnet unit 510 of the actuator 500 is arranged in a corner that is an empty space of the housing 300 to efficiently use an inner space of the cover can 100, but it may be provided in its side surface. More specifically, the magnet unit 510 comprises four magnets 511, 512, 513 and 514 that are disposed on the side surface of the housing 300 at regular intervals at an angle of 90°.

In a preferred embodiment of the present invention, there may be further included a hall sensor unit 900 that is arranged in the substrate 600 for thereby detecting the movement of the magnet unit 510. The hall sensor unit 900 is configured to sense the magnetic field of the magnet unit 510 and detects the displacement in the X- and Y-axes of the housing 300 in which the bobbin 200 is housed, thus accurately controlling the actuator 500 on the basis of a cooperative operation with the substrate 600.

Since the hall sensor unit 900 is disposed on a straight line along with the magnet unit 510 and needs to detect the displacement of the X-axis and the Y-axis, the hall sensor unit 900 may comprise two hall sensors provided in two neighboring corners among the corners of the Printed Circuit Board 600. As shown in FIG. 5. the hall sensor unit 900 is mounted on a hall sensor accommodation groove 412 of the base. The magnet unit may be arranged in a portion matching with the corner of the base or may be arranged in a portion matching with a predetermined side of the base.

The hall sensor unit 900 is arranged closer to the second coil unit 530 than the magnet unit 510; however in consideration of the facts that the intensity of the magnetic field formed in the magnet is hundreds of times higher than the intensity of the electromagnetic field formed in the coil, the influences of the second coil unit 530 may be neglected in the course of a detection of the movements of the magnet unit 510.

In addition, the hall sensor unit is arranged at an intermediate portion of the circular second coil unit and may be arranged on the surface that is opposite to the surface of the substrate where the second coil unit is arranged.

The present invention may be implemented according to another embodiment so as to achieve the same objects as in the first embodiment.

Figure 10:
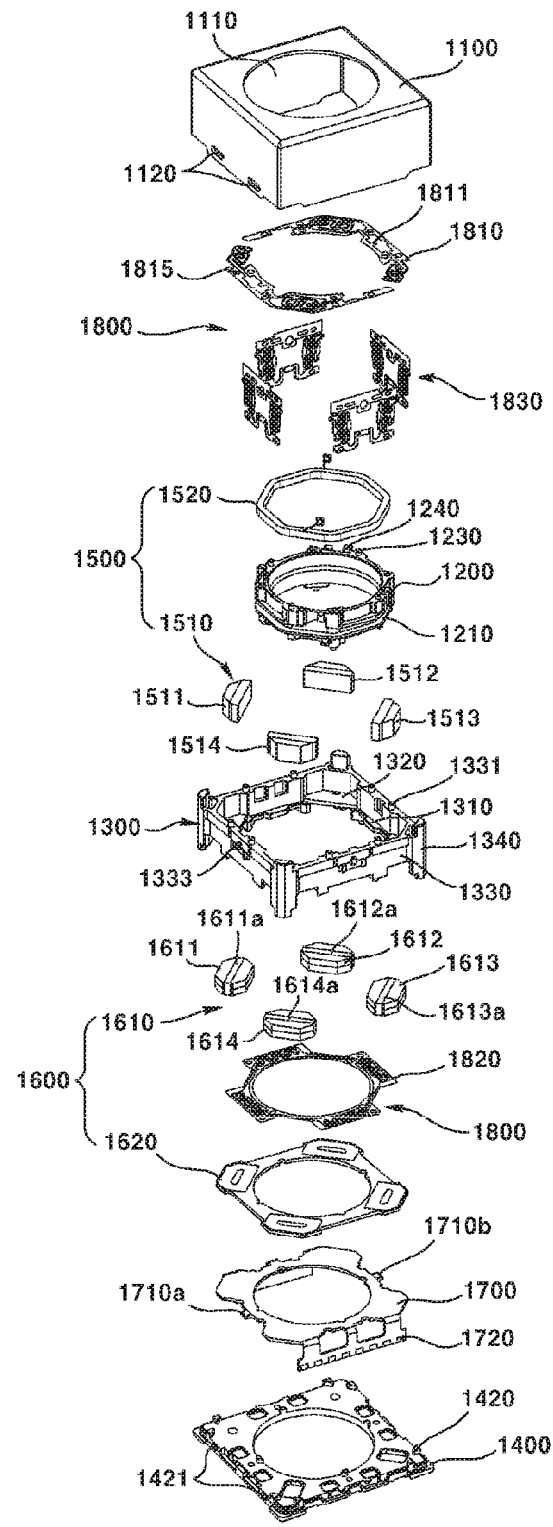
FIG. 10 is a disassembled perspective view illustrating a camera module according to another embodiment of the present invention.
Figure 11:
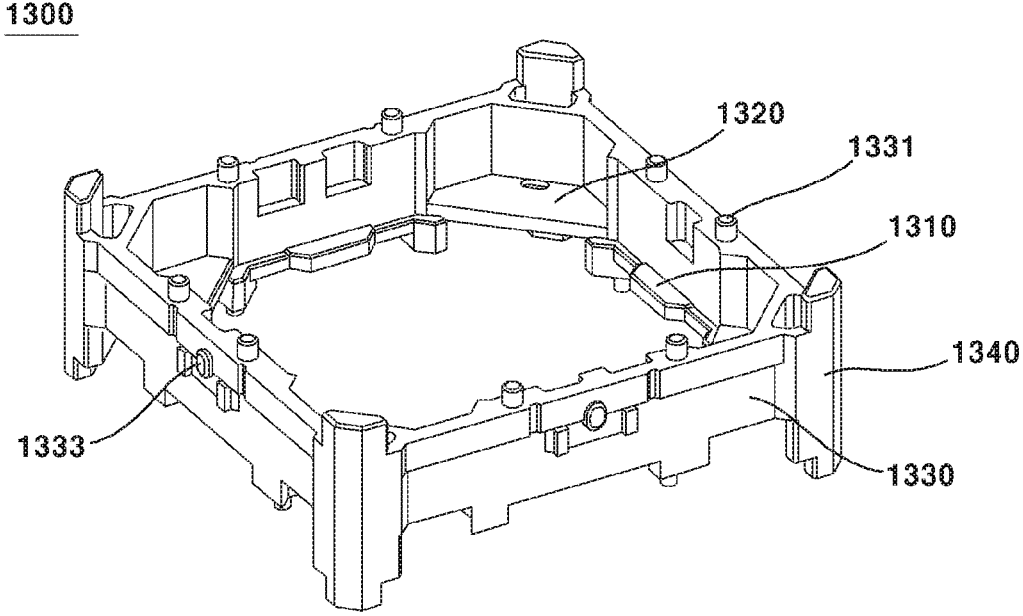
FIG. 11 is a perspective view illustrating the housing of FIG. 10.
Figure 12:
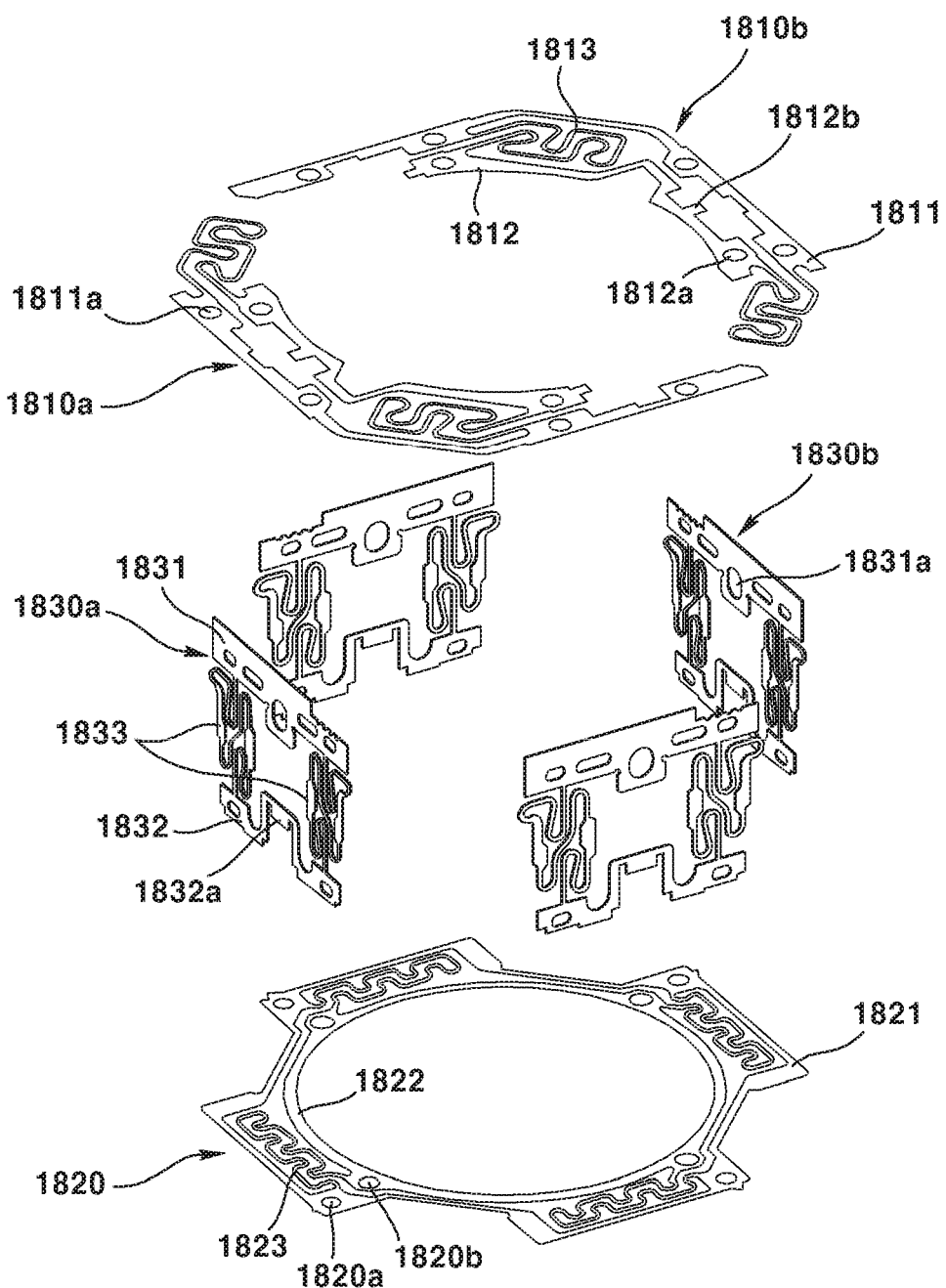
FIG. 12 is a view illustrating the side spring of FIG. 10.
Figure 13:
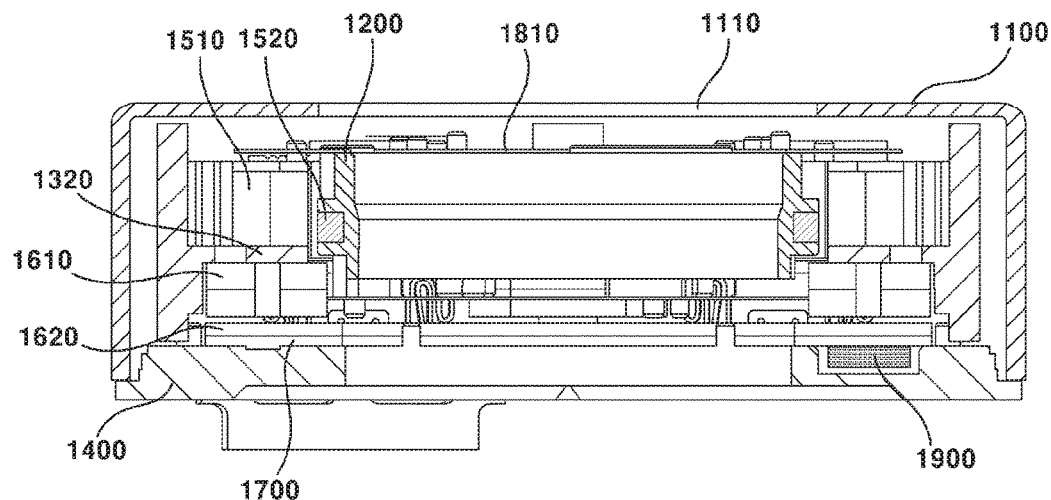
FIG. 13 is a side cross sectional view taken in a direction "A" of the camera of FIG. 1.
Figure 14:
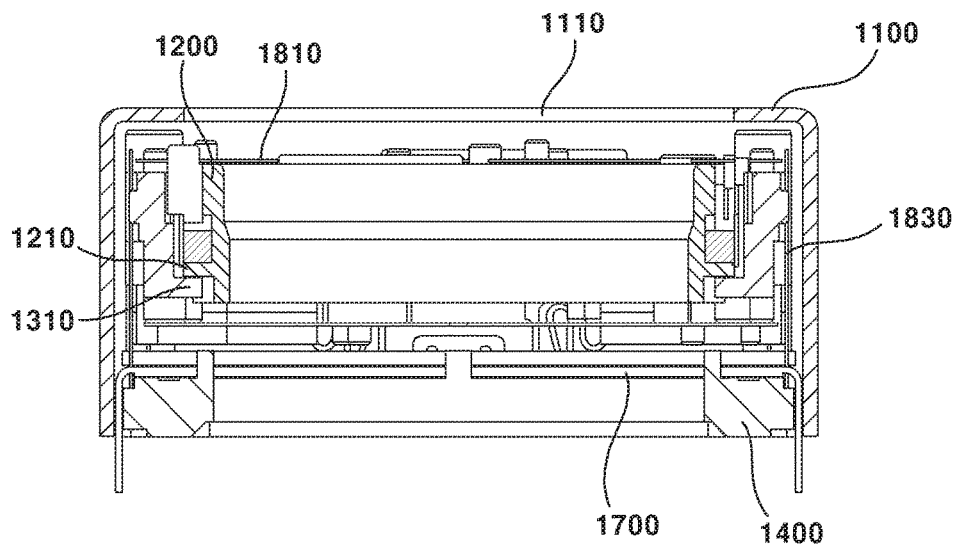
FIG. 14 is a side cross sectional view taken in a direction "B" of the camera module of FIG. 1.
Figure 15:
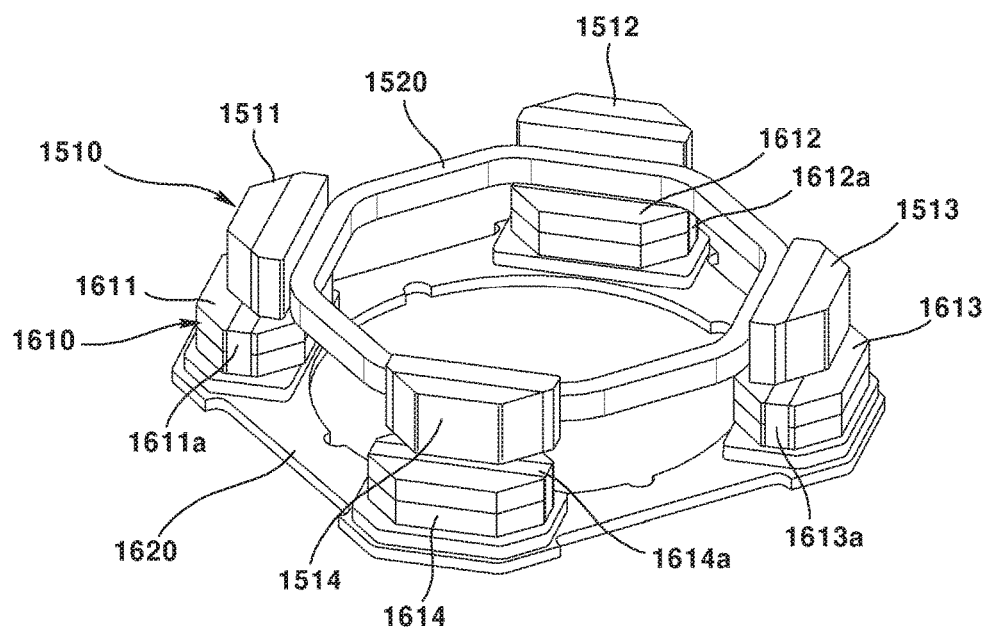
FIG. 15 is a schematic view illustrating a first actuator and a second actuator according to another embodiment of the present invention.
Figure 16:
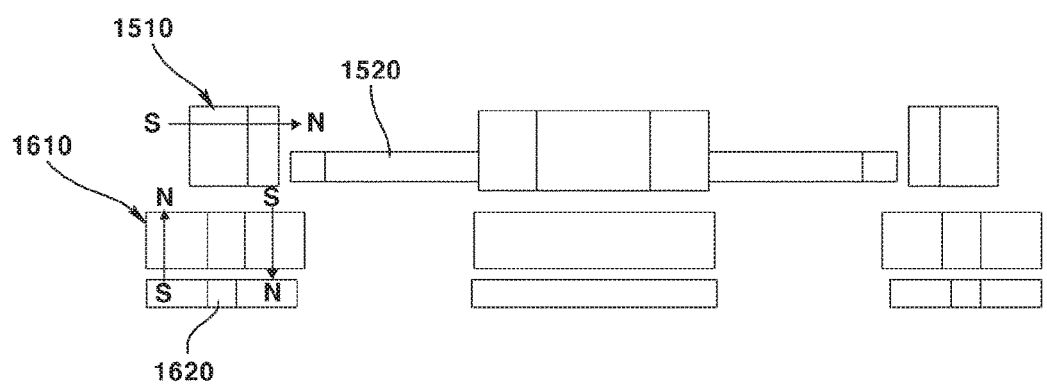
FIG. 16 is a view illustrating the magnetic directions of a first actuator and a second. actuator according to another embodiment of the present invention.
Figure 17:
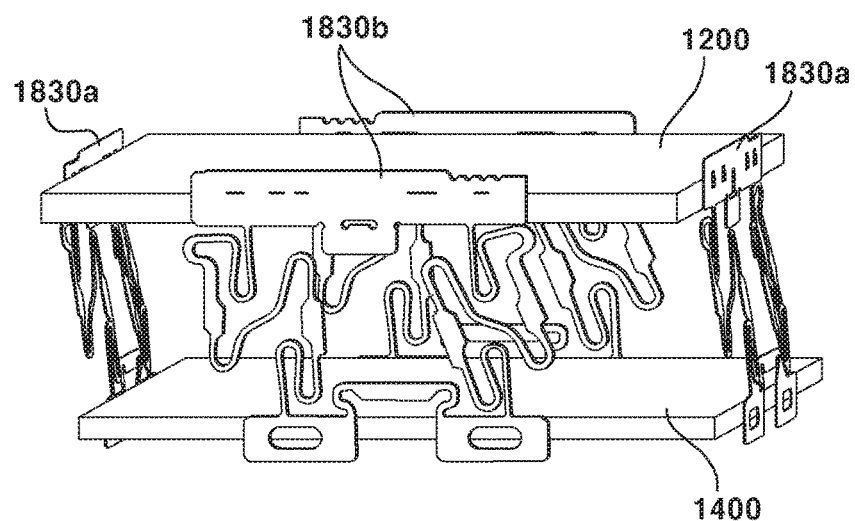
FIG. 17 is a little transformed perspective view illustrating a side spring, which view is shown for better understanding of another embodiment of the present invention.
Figure 18:
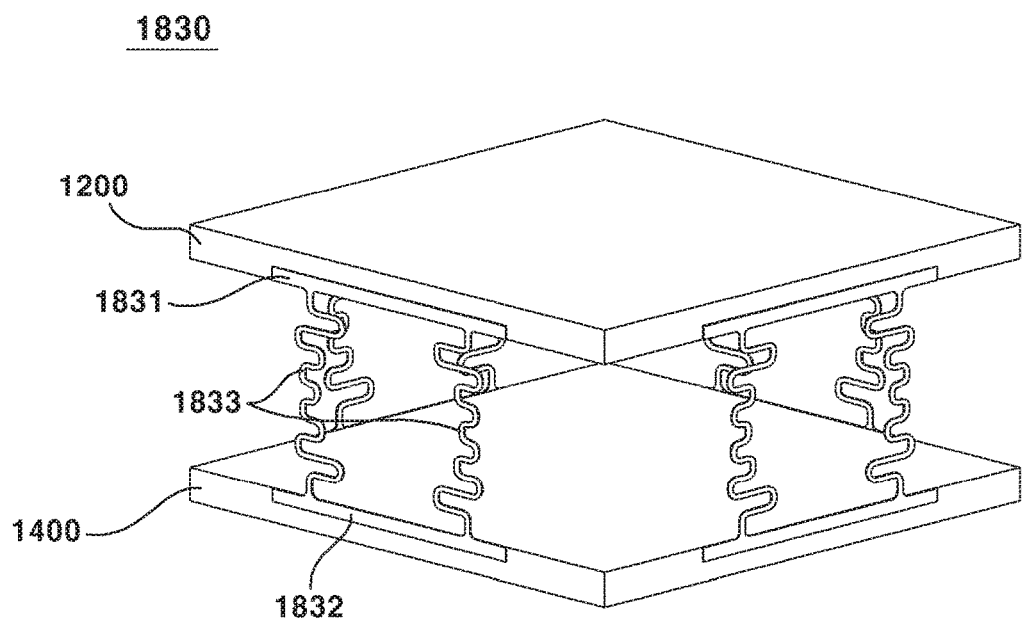
FIG. 18 is a schematic view illustrating a side spring according to another embodiment of the present invention.

FIG. 10 is a disassembled perspective view illustrating a camera module according to another embodiment of the present invention, FIG. 11 is a perspective view illustrating the housing of FIG. 10, FIG. 12 is a view illustrating the side spring of FIG. 10, FIG. 13 is a side cross sectional view taken in a direction "A" of the camera of FIG. 1, FIG. 14 is a side cross sectional view taken in a direction "B" of the camera module of FIG. 1, FIG. 15 is a schematic view illustrating a first actuator and a second actuator according to another embodiment of the present invention, FIG. 16 is a view illustrating the magnetic directions of a first actuator and a second actuator according to another embodiment of the present invention, FIG. 17 is a little transformed perspective view illustrating a side spring, which view is shown for better understanding of another embodiment of the present invention, and FIG. 18 is a schematic view illustrating a side spring according to another embodiment of the present invention.

The descriptions that are omitted in the following descriptions of another embodiment of the present invention may be referred to the same that was described in the one embodiment of the present invention.

As shown in FIGS. 1 and 10, the lens driving motor according to another embodiment of the present invention comprises, as its main components, a cover can 1100, a bobbin 1200, a housing 1300, a base 1400, a first actuator 1500, and a second actuator 1600. There may be further included a substrate 1700 and/or an elastic unit 1800.

More specifically, the cover can 1100 houses the bobbin 1200, the base 1400, the first actuator 1500, the second actuator 1600 and the elastic unit 1800 and is secured to the base 1400 and defines an exterior of the camera module or the lens driving motor.

As shown therein, on top of the cover can 1100 is formed an opening 1110 through which a lens is exposed. The cover can 1100 may be formed in a rectangular parallelepiped shape whose bottom is open, but it may be formed in various shapes. The cover can 1100 may be formed in a quadrangle shape or an octagonal shape when viewing from above, and it is not limited thereto.

More specifically, the cover can 1100 may come into close contact with or may come into close contact with or may be engaged to a side surface or an upper surface of the base 1400, and the lower surface or side surface of the cover can 1100 may be closed by the base 1400. It may be equipped with a function of protecting the inner components from external impacts or a function of preventing the input of external impurities. For a securing or engagement of the base 1400 and the cover can 1100, in the side surface of the cover can 1100, for example, in at least one side surface or lower portion may be formed at least one engaging groove 1120. In the base 1400, there may be included an engaging protrusion 1421 that is inserted in the engaging hole 1120 and that is formed to match with a side surface, thus obtaining more reliable sealing and securing functions of the camera module.

In addition, the cover can 1100 may have a function of protecting the components of the camera module or the lens driving motor from external radio interferences. So, the cover can 1100 may be made from a metallic material or it may be made from various materials such as a molded material or an insert molded material using a metallic material.

As shown in FIG. 10, the bobbin 1200 is housed in the cover can 1100 and may include a lens barrel (not shown) with which to photograph an object. The lens barrel is a component that belongs to the camera module and may include a predetermined means for engaging the lens barrel itself, and more specifically, threads may be formed in an inner surface of the bobbin. The bobbin 1200 may move in the Z-axis direction by means of the first actuator 1500.

The lens barrel (not shown) may be made in a cylindrical case that can fix at least one lens. The lens barrel may be engaged to an inner side of the bobbin 1200 using an adhesive, not in a thread engagement method, however it may be thread-engaged on the basis of the threads that match with the threads 201 (refer to FIG. 3) formed in an inner surface.

In an outer side surface of the bobbin 1200 is provided at least two protruding flange units 1210. Here, the flange units 1210 are mounted on or arranged in the mounting portion 1310 of the housing 1300, the construction of which limits the downward movement and/or rotational motions of the bobbin 1200.

In the upper surface of the bobbin 200 may be provided at least two protruding upper surface engaging protrusions 1230 that match with the inner side engaging hole 1812a or the groove that is formed in the inner side portion 1812 of the upper spring 1810. At least two auxiliary stoppers 1240 that are positioned close to the cover can 1100 may protrude from the same. The upper surface engaging protrusion 1230 and the inner side engaging hole 1812a or the groove may be fixed in a thermosetting, adhering or soldering way after they are inserted.

As shown in FIGS. 10 and 11, the housing 1300 is secured to the base 1200 and supports the bobbin 1200. It may serve to partition the interior of the cover can 100 into an upper space and a lower space.

More specifically, the housing 1300 comprises a body 1330 that partitions the interior of the cover can 1100 into an upper space and a lower space, and two or more than support bodies 1340 that are secured to the base 1400 and that are constituted in the downward direction from the body 1330 so as to space apart the body 1330 in the upward direction of the base 1400.

The body 1330 may be configured in a certain shape that matches with the inner side surface of the cover can 1100. In this embodiment of the present invention, each of the cover can 1100 and the body 1330 is formed in a quadrangle shape, however it is not limited thereto.

From each outer side surface of the body 1330 may protrude a side surface engaging protrusion 1333 for an engagement of the first engagement portion 1831 of the side spring 1830. In the first engaging portion 1831 of the side spring 1830 may be formed a first engaging hole 1838 or a groove that matches with the side surface engaging protrusion 1333. Here, the side surface engaging protrusion 1333 and the first engaging hole 1838 or the groove may be fixed in a thermosetting, adhering or soldering way after they are inserted.

From each upper surface of the body 430 may protrude an upper side engaging protrusion 1331 for an engagement of the upper spring 1810, and in the upper spring 1810 is formed an outer side engaging hole 1811a or a groove that matches with the upper side engaging protrusion 1331.

In the body 1330 is formed a mounting portion 1310 that is vertically formed in an inner side of the side surface. In the mounting portion 1310 is mounted the flange unit 1210 of the bobbin 1200, thus consequently limiting the downward movements of the bobbin 1200. The mounting portion 1310 is constituted in a rim shape or in a protruding shape. It may protrude continuously or non-continuously from an inner side surface of the body 1330 and may be provided at a predetermined interval for a formation of a blocking rib 1320.

In the upper space within the cover can 100 that is partitioned by the housing 1300 are installed the first actuator 1500 and the upper spring 1810. In the lower space of the cover can 1100 are provided the second actuator 1600, the Printed Circuit Board 1700, and the lower side spring 1820. There is further mounted a side spring 1830 that connects the upper space and the lower space.

In the body 1330 may be provided a blocking rib 1320 that protrudes from an inner side of each corner so as to block the first actuator 1500 and the second actuator 1600, more specifically, so as to block the firs magnet unit 1510 and the second magnet unit 1610. Such components may not be installed. Here, the blocking rib 1320 may be formed between the mounting portions 1310 that are formed at regular intervals.

Meanwhile, it is preferred that the support body 1340 are four support bodies 1340 that are spaced apart at an angle of 90° for a stable support or are provided in corners. The X- and Y-axes movements may be limited or activated in such a way that the outer side of the bottom of the support body 1340 is limited or activated by the inner side surface of the cover can 1100 and the inner side of the same is limited or activated by the fixing protrusion 1420 that is installed in the base 1400.

As shown in FIGS. 10, 13 and 14, the base 1400 is configured in a shape that matches with the open surface of the lower side of the cover can 1100. In another embodiment of the present invention, it is configured in a quadrangle shape, which shape is not limited thereto. The base 1400 is secured to the bottom of the cover can 1100 and supports the components in the cover can 1100 from below.

In addition, in the side surface of the base 1400 may be provided an engaging protrusion 1421 that matches with the engaging hole 1120 formed in the cover can 1100. On the contrary, an engaging protrusion (not shown) protruded from an inner side surface of the cover can 1100, and an engaging hole (not shown may be formed in the base 1400.

The base 1400 is engaged to the second engaging portion 1832 of the side spring 1830. On the upper surface of the base 1400 is provided a fixing protrusion 1420 so as to fix the support body 1340 of the housing 1300.

Like the base 400 of the earlier described embodiment, the base 1400 according to another embodiment of the present invention comprises a side spring insertion groove 411, a solder ball accommodation grove 413, and a hall sensor accommodation groove 412.

As shown in FIGS. 10, 13 and 15, the first actuator 1500 is disposed between the side surface of the bobbin 1200 and the cover can 1100, or the housing so as to move the bobbin 1200 in an upward or downward direction.

More specifically, the first actuator 1500 comprises a first coil unit 1520 that is arranged in an outer side surface of the bobbin 1200 and is electrically connected to the Printed Circuit Board 1700, and a first magnet unit 1510 that is arranged in an inner side surface of the body 1330 of the housing 1300 to match with the first coil unit 1520.

The first coil unit 1520 can be controlled by the substrate 1700 and generates an electromagnetic field on the basis of the current applied to the wound coil and interacts with the magnetic field from the first magnet unit 1510, thus moving the bobbin 1200 in an upward or downward direction. The first coil unit 1520 may be previously wound in a shape matching with the outer circumferential surface of the bobbin 1200 or may be wound on an outer circumferential surface of the bobbin 1200.

The electric power supplied to the substrate 1700, to the first coil unit 1520 is applied to a pair of the side springs 1830 or the facing side springs 1830 that are electrically connected with the substrate 1700 and to the upper spring 1810 that is electrically connected to a pair of the side springs 1830 or the facing side springs 1830 and then to the coil. The above mentioned electric connections will be described later.

The second actuator 1600 is arranged between the bottom of the side surface of the housing 1300 and the upper side surface of the base 1400 so as to move the bobbin 1200 in the X- and Y-axes direction.

More specifically, the second actuator 1600 comprises a second coil unit 1620 that is mounted on the substrate 1700 and is electrically connected to the substrate 1700, and a second magnet unit 1610 that is arranged in an inner side surface of the housing 1300 to match with the second coil unit 1620.

Different from the circular first coil unit 1520, the second coil unit 1620 may be provided by four in number on the substrate 1700 at an angle of 90°, and the four second coil units 1620 may be installed on the substrate 1700 in separate forms from one another or may be installed in pairs or may be grouped depending on the design and then may be controlled.

The current applied via the substrate 1700 is applied to the coil wound on the second coil unit 1620 and generates electromagnetic field, and the generated electromagnetic field interacts with the magnetic field of the second magnet unit 1610, thus moving the housing 1300 in the X-and Y-axes directions.

When a compactness of a camera module is considered, more specifically, when it needs to lower the height in the Z-axis direction that is the optical axis, the second coil unit 1620 may include a patterned coil or a separate coil.

As shown in FIGS. 1 and 10, the substrate 1700 is secured to or engaged to or bonded on top of the base 1400, more specifically, it is arranged on the base 1400 so as to control the actuators 1500 and 1600.

The substrate 1700 may be disposed between the second coil unit 1530 and the base 1400 so as to apply electric power or current that is supplied to control the first coil unit 1520 and the second coil unit 1530 and may be like the flexible Printed Circuit Board (FPCB).

The substrate 1700 comprises two soldering points 1710a and 1710b formed to be electrically connected with the two second engaging portions 1832 of the two side springs 1830a and 1830b. The two second engaging portions 1832 include soldering portions 1832a for soldering on the soldering points 1710a and 1710b of the substrate 600.

The substrate 1700 may comprise a terminal 1720 that is electrically connected with the separate Printed Circuit Board and is bent in a downward direction from at least one side surface so as to receive electric power.

In another embodiment of the present invention, there are included two actuators 1500 and 1600, more specifically, there are included a first actuator 1500 that moves the bobbin in the Z-axis direction, namely, the optical axis direction, and a second actuator 1600 that moves in the X- or Y-axes direction the housing 1300 that houses the bobbin 1200. Here, both the first actuator and the second actuator are separately driven, so a faster focusing and reliable handshaking prevention functions can be obtained.

As shown in FIGS. 10 and 12, the elastic unit 1800 comprises an upper spring 1810, a lower spring 1820 and a side spring 1830.

Here, the upper spring 1810, the lower spring 1820 and the side spring 1830 may be arranged on each surface of the housing 1300 or they may be like common coil springs. For enhanced manufacture efficiency, they are made from a leaf spring that a single sheet is bent and cut.

The upper spring 1810 supports top of the bobbin 1200 and may be arranged on top of the housing 1300 so as to provide returning force for the upward movement of the bobbin 1200.

More specifically, the upper spring 1810 comprises a first upper spring 1810a to which electric power is inputted from the Printed Circuit Board 1700, and a second upper spring 1810b wherein the inputted electric power is conducted to the first coil unit 1520 and is outputted. The first upper spring 1810a and the second upper spring 1810b may be made from leaf springs that are symmetrical about the optical axis.

The first upper spring 180a and the second upper spring 1810b each comprises an outer portion 1811 that is engaged to the housing 1300, an inner portion 1812 that is secured to the bobbin 1200, and a connection portion 1813 that is electrically connected to the outer portion 1811 and the inner portion 1812, respectively.

As shown in the drawings, the connection portion 1813 may be two bending portions that are disposed between the outer portion 1811 and the inner portion 1812.

As described above, on an upper surface of the housing 130 is provided at least one upper side engaging protrusion 1331, and in the outer portion 1811 is formed an outer engaging hole 1811a that matches with the upper side engaging protrusion 1331.

The outer portion 1811 is electrically connected to the two side springs 1830 and may be integrally bent or may be connected by a soldering.

On an upper surface of the bobbin 1200 is formed at least one upper surface engaging protrusion 1230. In the inner portion 1812 is formed an inner side engaging hole 812a that matches with the upper surface engaging protrusion 1230.

In the inner portion 1812 of each of the first upper spring 1810a and the second upper spring 1810b is formed a second protrusion 1812b that is electrically connected to an end and the other end of the coil wound on the first coil unit 1520. Here, the end and the other end of the coil and the second protrusion 1812b may be electrically soldered.

The lower spring 1820 is arranged in the bottom of the housing 1300 so as to support the bottom of the bobbin 1200. Since electric power of the substrate 1700 is not inputted and outputted, it may be made from a single leaf spring. The lower spring 1820 comprises an outer portion 1812 that is arranged in the housing 1300, an inner portion 1822 that is arranged in the bobbin 1200, and a connection portion 1823 that is configured to connect the outer portion 1821 and the inner portion 1822. In the outer portion 1821 and the inner portion 1822 of the lower spring 1820 may be formed at least two engaging holes 1820a and 1820b that are engaged to the protrusion (not shown) formed in the lower side surface of the bobbin 1200.

A portion of the side spring 1830 is secured to a side surface of the housing for vibration attenuation in the X- and Y-axes directions, The other side of the same is secured to a side surface of the base 1400. The side spring 1830 may consist of four side springs at regular intervals at an angle of 90°.

More specifically, the side spring 1830 comprises a first engaging portion 1831 that is engaged to a side surface of the housing 1300, a second engaging portion 1832 that is engaged to a side surface of the base 1400, and an elastic portion 1833 that is vertically formed on the first engaging portion 1831 and the second engaging portion 1832.

The elastic portion 1833 may be at least one bending portion. The elastic portion 1833 may be provided by two in number in a facing shape in one side spring 1830.

In the first engaging portion 1831 of the side spring 1830 is formed a first engaging groove 1831a that matches with the side engaging protrusion 1333 formed in the housing 1300. The side surface engaging protrusion 1333 and the first engaging hole 1831a may be fixed by a thermosetting, adhering or soldering way.

In the same way, the second engaging portion 1832 may be secured to the base 1400 in the same way as in the first engaging portion 1831 or the second engaging portion 1832 may be slide-engaged by forming a slit-shaped side spring insertion groove having the same width as the second engaging portion 1832 in the base 1400.

A damper member (not shown) may be coated on the adhering surfaces of the side spring 1830 and the housing 1300 and/or the base 1400. The damper member may be made from sol or gel material or UV damper material or epoxy material. It is coated between the side spring 1830 and the housing 1300 and/or the base 1400 for thereby absorbing impacts.

At least two side springs 1830 are arranged in the side surfaces of the housing 1300 and the base 1400 while facing each other and may be provided in four corners of the housing for efficient vibration attenuation.

The second engaging portions 1832 of the two side springs 1830a and 1830b among the side springs 1830 are electrically connected to the substrate 1700, and the first engaging portions 1831 of the two side springs 1830a and 1830b are electrically connected to the upper spring 1810, and the upper spring 1810 is electrically connected to an end and the other end of the coil wound on the first coil unit 1520.

In the embodiments of the present invention, a separate electric power supply cable is not necessary so as to supply electric power to the first coil unit 1520, so the reliability and durability of the camera module can be enhanced, and compact-sized products can be manufactured.

In the present embodiment, the side spring is like a leaf spring, but in another embodiment, it may be made from a suspension wire. In this case, the suspension wire may be arranged in the housing and the corners of the base and may be arranged symmetrically about the optical axis. The suspension wire is electrically connected to the upper spring and the substrate for thereby supplying current to the first coil unit. The suspension wire may be provided by four in number in each corner. It may be provided by six or may be provided by eight in number in each corner. The number of the same is subject to a design specification.

FIG. 17 is a transformed perspective view illustrating a side spring for helping better understanding of the embodiment of the present invention.

As shown in FIG. 17, the side spring 1830 receives force in the leftward direction. Here, the side spring 1830 of both sides receive force in the fx direction, and the side spring 830b of the front and rear side receives force in the fy direction.

An end and the other end of each elastic portion 1833 of all the side spring 1830 are just enough to position vertically with respect to the first engaging portion 1831 and the second engaging portion 1832 that are horizontally formed. It is also just enough to form at least one bending portion in the intermediate portion. It is preferred that the following conditional expression is satisfied.

$K_x = 0.5 \sim 2.0 K_y$ $K_z = 5 \sim 100 K_x$,  <Conditional Expression> where, K represents a spring constant.

It is preferred that the spring constant of the X-axis direction and the spring constant of the Y-axis direction are roughly same. It is preferred that the spring constant of the Z-axis direction is 5 times to 100 times higher than the spring constant of the X-axis or Y-axis direction.

The reason it is preferred that the above mentioned conditional expression is satisfied comes from the formula "f=$K_x$", where "f" represents a force of a magnet coil, and "x" represents a moving distance. If the value "K" is small, the bobbin can be moved on the basis of the value "f". The spring constant corresponding to the value I should be considered in view of the X-, Y- and Z-axes directions.

The reason that the Z-axis movement is considered for the side spring 830 so as to provide a returning force with respect to the movements in the X- and Y-axes directions comes from the consideration on the weight itself of the bobbin 200 in which contains the lens. In addition, it comes from the fact that the photographing direction of the camera can direct toward the ground or the sky.

Another embodiment of the present invention is shown in the side spring. FIG. 18 is a schematic view illustrating a side spring according to another embodiment of the present invention. The side spring 1830 according to another embodiment of the present invention has a little simplified construction as compared with the side spring 1830 of the earlier embodiment. It is constructed to satisfy the above mentioned conditional expression. Once the above mentioned conditional expression is satisfied, the bending shape and position of the leaf spring can he changed in various forms.

The constructions and engaged relationships of the first actuator 1500 configured to move the bobbin upward and downward along the Z-axis the second actuator 1600 configured to move the bobbin along the X- and Y-axes will be described below.

As shown in FIGS. 10 and 13 to 16, the first actuator 1500 and the second actuator 1600 according to another embodiment of the present invention may be positioned horizontally with respect to each other about the Z-axis that is the optical axis, As described earlier, since the housing 1300 and the base 1400 match with the shape of the inner side surface of the cover can 1100, if the inner side surface of the over can 1100 is quadrangle, the housing 1300 and the base 1400 are made in the quadrangle shapes.

In this state, in consideration of the circular bobbin 1200 in the housing 1300, it is preferred that the first actuator 1500 and the first magnet unit 1510 are arranged in the empty corners of the housing 1300 to more efficiently use the inner space of the cover can 1100. In this regard, the second magnet 1610 of the second actuator 1600 may be positioned on a horizontal, straight line in the Z-axis direction along with the first magnet unit 1510.

The first magnet unit 1510 comprises four magnets 1511, 1512, 1513 and 1514 that are arranged at regular intervals at an angle of 90° in the inner surface of the housing 1300. The second magnet unit 1610 comprises four magnets 1611, 1612, 1613 and 1614 that are arranged at regular intervals at an angle of 90°.

As shown in FIG. 16, the first magnet unit 1510 has an S-pole polarity in its outer side and has an N-pole polarity in the optical axis direction. The second magnet unit 1610 has an N-pole polarity in its outer side and has an S-pole polarity in the axis direction. They may be arranged for their polarities to be reversed.

Here, since the magnets 1611, 1612, 1613 and 1614 of the second magnet unit 1610 should be arranged to generate the magnetic field in the direction where the hand-shaking prevention function can be implemented by means of the second coil unit 1620 positioned below, there may be included polarity-free neutral portions 1611a, 1612a, 1613a and 1614a.

In the above described polarity-based state, since the first magnet unit 1510 and the second magnet unit 1610 are positioned on a straight line, the assembling work can be easier with the aid of attractive force in the course of the assembling of the camera module.

It is preferred that the first magnet unit 1510 should be free from any influence from the magnetic field of the second coil unit 1620, and the second magnet unit 1610 should be free from any influence from the magnetic field from the first coil unit 1520, so, as shown in FIGS. 2 and 3, there is provided the blocking rib 1320 that protrudes toward the inside of the housing 1300 for thereby blocking the first magnet unit 1510 and the second magnet unit 1610 from each other.

As shown in FIG. 13, there may be further included a hall sensor unit 1900 that is arranged in the substrate 1700 for thereby detecting the movements of the second magnet unit 1610 according to another embodiment of the present invention. Here, the hall sensor unit 1900 serves to sense the magnetic field from the second magnet unit 1610 and to detect the displacement in the X- and Y-axes of the housing 1300 in which contains the bobbin 1200, so it is possible to accurately control the second actuator 1600 on the basis of the interaction with the substrate 1700.

Since the hall sensor unit 1900 is arranged on a straight line along with the second magnet unit 1610 and serves to detect any displacement in the X- and Y-axes, the hall sensor unit 1900 comprises two hall sensors that are arranged in two neighboring corners among the corners of the Printed Circuit Board 1700 and may be mounted in the hall sensor accommodation groove of the base 1400.

The hall sensor unit 1900 is arranged closer to the second coil unit 1620 than the second magnet unit 1610. In consideration of the facts that the intensity of the magnetic field from the magnet is hundreds of times higher than the magnetic field from the coil, any influences of the second coil unit 1620 may be neglected when detecting the movements of the second magnet unit 1610.

It is preferred that the hall sensor unit 900 is mounted beneath the substrate 1700.

In addition, the lens driving device according to embodiments of the present invention may comprise a camera module by including a lens, an image sensor and a Printed Circuit Board. The lens is secured to the bobbin, and the Printed Circuit Board in which is mounted the image sensor may be arranged below the base.

Here, the thus constituted camera module may be included in various digital devices such as a cellular phone, a tablet computer, a computer, etc.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A lens driving device, comprising:
a cover can comprising an upper plate and a side plate extending from the upper plate;
a base coupled to the cover can;
a housing spaced apart from the base and disposed in the cover can;
a bobbin disposed in the housing;
a first coil unit disposed on the bobbin;
a second coil unit disposed on the base,
a magnet unit disposed on the housing;
a substrate disposed between the second coil unit and the base; and
a first elastic unit coupled to the bobbin and the housing, wherein the first elastic unit comprises an upper spring disposed on an upper portion of the housing and a lower spring disposed at a lower portion of the housing;
a second elastic unit connected to the upper spring; and
a hall sensor unit disposed on a lower surface of the substrate;
wherein the second coil unit is connected to the substrate by a solder ball,
wherein the base comprises a first groove corresponding to the hall sensor unit and a second groove corresponding to the solder ball,
wherein the hall sensor unit is disposed in the first groove of the base, and
wherein the bobbin comprises at least two flange units protrusively formed at an outer surface thereof, and the housing comprises mounting portions at an inner side surface corresponding to the flange units, respectively, and
wherein the magnet unit is disposed in the corner of the housing.

2. The device of claim 1, wherein the housing comprises at least two first upper stoppers protruding from an upper surface thereof, wherein the bobbin comprises at least two second upper stoppers protruding from an upper surface thereof.

3. The device of claim 2, wherein the housing further comprises at least two first lower stoppers protruding from a lower surface of the housing.

4. The device of claim 2, wherein the first upper stoppers are respectively disposed at corners of the housing when viewed from top.

5. The device of claim 2, wherein the first coil unit faces an inner side surface of the magnet unit in a horizontal direction, and the second coil unit faces a lower surface of the magnet unit in a vertical direction.

6. The device of claim 5, wherein the second coil unit is either a patterned coil or multiple separate coil elements.

7. The device of claim 2, wherein the second elastic unit is disposed between the upper spring and the substrate.

8. The device of claim 7, wherein the second elastic unit is disposed between one corner of the housing and adjacent corner of the housing.

9. The device of claim 8, wherein the second elastic unit comprises at least four second elastic units.

10. The device of claim 7, wherein the upper spring comprises a first upper spring electrically connected to an end of a coil wound on the first coil unit, and a second upper spring electrically connected to the other end of the coil wound on the first coil unit, and wherein the first upper spring and the second upper spring are electrically connected to the substrate through the second elastic unit.

11. The device of claim 7, wherein the upper spring and the lower spring are a leaf spring.

12. The device of claim 11, wherein the second elastic unit is a leaf spring.

13. The device of claim 2, wherein the magnet unit comprises a first magnet facing the first coil unit and a second magnet facing the second coil unit.

14. The device of claim 1, wherein the hall sensor unit disposed on the lower surface of the substrate is configured to detect a movement of the magnet unit.

15. The device of claim 1, wherein at least a portion of the solder ball is disposed in the second groove of the base.

16. The device of claim 1, wherein the magnet unit comprises four magnets disposed at an angle of 90°, and the hall sensor unit comprises two hall sensors disposed on a straight line along with the magnet unit in an optical axis direction and disposed to be opposite to neighboring magnets.

17. The device of claim 1, wherein the substrate comprises at least one terminal extended in the optical axis direction to supply electric power to the first and second coil units.

18. The device of claim 1, wherein the housing further comprises at least one first upper side engaging protrusion protruding from the upper surface thereof,
wherein the bobbin further comprises at least one second upper surface engaging protrusion protruding from the upper surface thereof, and
wherein the upper spring comprises an outer portion having an outer engaging groove matching the upper side engaging protrusion of the housing, an inner portion having an inner engaging groove matching the upper surface engaging protrusion of the bobbin, and a connection portion connecting the outer portion and the inner portion.

19. The device of claim 1, wherein the first coil unit faces an inner side surface of the magnet unit in a horizontal direction, and the second coil unit faces a lower surface of the magnet unit in a vertical direction.

20. The device of claim 19, wherein the second coil unit is either a patterned coil or multiple separate coil elements.

21. The device of claim 1, wherein the second elastic unit is disposed between one corner of the housing and adjacent corner of the housing.

22. The device of claim 21, wherein the second elastic unit comprises at least four second elastic units.

23. The device of claim 1, wherein the upper spring comprises a first upper spring electrically connected to an end of a coil wound on the first coil unit, and a second upper spring electrically connected to an other end of the coil wound on the first coil unit, and wherein the first upper spring and the second upper spring are electrically connected to the substrate through the second elastic unit.

24. The device of claim 1, wherein the upper spring and the lower spring are each a leaf spring.

25. The device of claim 1, wherein the second elastic unit is a leaf spring.

26. The device of claim 1, wherein the magnet unit comprises a first magnet facing the first coil unit and a second magnet facing the second coil unit.

27. The device of claim 1, wherein the housing comprises at least two first upper stoppers protruding from an upper surface thereof and at least two first lower stoppers protruding from a lower surface thereof.

28. The device of claim 27, wherein the first upper stoppers and the first lower stoppers are disposed on a straight line about the optical axis direction and are positioned close to a magnet unit.

29. The device of claim 27, wherein the first upper stoppers are respectively disposed at corners of the housing when viewed from top.

30. The device of claim 27, wherein the housing further comprises at least one first upper side engaging protrusion protruding from the upper surface thereof,
wherein the bobbin further comprises at least one second upper surface engaging protrusion protruding from the upper surface thereof, and
wherein the upper spring comprises an outer portion having an outer engaging groove matching the upper side engaging protrusion of the housing, an inner portion having an inner engaging groove matching the upper surface engaging protrusion of the bobbin and a connection portion connecting the outer portion and the inner portion.

31. A camera, comprising;
a cover can comprising an upper plate and a side plate extending from the upper plate;
a base coupled to the cover can;
a housing spaced apart from the base and disposed in the cover can;
a bobbin disposed in the housing;
a lens coupled to the bobbin;
a first coil unit disposed on the bobbin;
a second coil unit disposed on the base,
a magnet unit disposed on the housing;
a substrate disposed between the second coil unit and the base;
an image sensor disposed below the substrate;
a first elastic unit coupled to the bobbin and the housing, wherein the first elastic unit comprises an upper spring disposed on an upper portion of the housing and a lower spring disposed at a lower portion of the housing; and
a second elastic unit disposed between the upper spring and the substrate;
wherein the housing comprises at least two first upper stoppers protruding from an upper surface thereof and at least two first lower stoppers protruding from a lower surface thereof,
wherein the bobbin comprises at least two second upper stoppers protruding from an upper surface thereof; and
wherein the bobbin comprises at least two flange units protrusively formed at an outer surface thereof, and the housing comprises mounting portions at an inner side surface corresponding to the flange units, respectively, and
wherein the magnet unit is disposed in the corner of the housing.

* * * * *